United States Patent
Bartlett et al.

[11] 3,903,831
[45] Sept. 9, 1975

[54] AMPHIBIOUS VEHICLE

[75] Inventors: Robert N. Bartlett, Atherton; Allen R. Bartlett, San Carlos, both of Calif.

[73] Assignee: Waterland Corporation, Belmont, Calif.

[22] Filed: May 14, 1973

[21] Appl. No.: 360,224

[52] U.S. Cl. .................... 115/1 A; 180/43 R
[51] Int. Cl. ................................... B60f 3/00
[58] Field of Search ............... 115/1 R, 1 A; 9/1 T; 180/70 R, 71, 72, 43 R, 43 A, 54 E

[56] References Cited
UNITED STATES PATENTS

| | | | |
|---|---|---|---|
| 2,350,037 | 5/1944 | Hofheins et al. | 115/1 R |
| 2,981,221 | 4/1961 | Gillois et al. | 115/1 A |
| 3,057,319 | 10/1962 | Wagner | 115/1 A |
| 3,065,811 | 11/1962 | Parrett | 180/70 R |
| 3,151,663 | 10/1964 | Bohner et al. | 115/1 A |
| 3,446,175 | 5/1969 | Boehler et al. | 115/1 R |
| 3,584,592 | 6/1971 | Perrine | 115/1 A |
| 3,618,149 | 11/1971 | Christensen | 9/1 T |
| 3,755,835 | 9/1973 | Boersig | 9/1 T |
| 3,765,368 | 10/1973 | Asbeck | 115/1 A |

FOREIGN PATENTS OR APPLICATIONS

| | | | |
|---|---|---|---|
| 649,243 | 1/1951 | United Kingdom | 9/1 T |
| 806,516 | 12/1936 | France | 180/72 |

OTHER PUBLICATIONS

*Autocar*, "Talking of Sports Cars (No. 225)," Oct. 20, 1944, pp. 750, 751.

*Primary Examiner*—Trygve M. Blix
*Assistant Examiner*—Edward R. Kazenske
*Attorney, Agent, or Firm*—Townsend and Townsend

[57] ABSTRACT

An amphibious vehicle having an improved hull design and provided with retractable front and rear wheel assemblies which move from lowered, ground-engaging positions to elevated, retracted positions substantially above the waterline when the vehicle is in the water. The vehicle has a rear mounted engine provided with a forwardly extending, articulated drive shaft coupled through an improved, floating power transfer mechanism to the front wheels for driving the same. Improved steering means is provided for the front wheels to permit steering of the vehicle. A marine outdrive is carried by the vehicle at the rear thereof and is coupled with the engine for propelling the vehicle through the water. Sliding hatch panels for the vehicle rear wheel wells close the latter to streamline the hull for marine operation and to increase the buoyancy thereof. An interlock system is utilized to prevent retraction of the wheels when the vehicle is on land and when the engine transmission is in gear.

33 Claims, 17 Drawing Figures

AMPHIBIOUS VEHICLE

This invention relates to improvements in amphibious vehicles and, more particularly, to a vehicle suitable for private or consumer use as an amphibious motor home.

BACKGROUND OF THE INVENTION

Houseboats of conventional design have been made so that they can be transported over the ground by means of a trailer. However, travel is difficult (other than for short trips) because the trailer must be available to remove the craft from the water. The houseboat cannot be launched at one location and then removed from the water at a second location without moving the trailer to the second location.

Amphibious vehicles have also been utilized in the past but primarily only for military purposes. Such vehicles have an appearance which is typical of military vehicles, i.e., drab and dull and lacking in external ornamentation. Such vehicles are not usable as a motor home and are limited in speed on water due to drag caused by poor hull design and protruding structures, such as lowered wheels and the like.

A representative amphibious vehicle is the one disclosed in U.S. Pat. No. 2,350,037, issued May 30, 1964. This vehicle has a number of disadvantages including the following:

1. It has no fully retractable wheels.
2. All of the mechanical automotive parts, such as wheels in retracted positions, are at least partially below the normal waterline of the vehicle.
3. It has open rear wheel wells.
4. It requires separate steering mechanisms when operating on land and on water.
5. Its steering mechanism for land use is affected by the vertical positions of the wheels when turning.
6. It has a common power takeoff for the wheel drive and the marine drive.
7. It lacks safety features such as structural interlocks and the like.

The suspension principle taught in the foregoing patent is that of an essentially horizontal, elongated transmission attached to and pivoted from the hull itself. Since the transmission must be substantially horizontal to accomplish the springing over the road, the attaching to the hull must be below the waterline. Thus, even though it is said that the wheels are "fully" retracted for water use, this is not actually possible with the mechanism disclosed in the patent using the dimensions and relative positions of the various parts of the vehicle as described. The transmission being attached to the hull, will still be in the water, thus preventing the realization of a truly efficient hydrodynamic shape.

The steering mechanism disclosed in the above patent is only suitable for use with a substantially horizontal, elongated transmission and, in fact, does not pivot about the center of rotation of the transmission. Thus, the steering mechanism is only on such center when the wheels are aligned in a straight-forward position, thereby causing the turning radius relationship between the wheels to be thrown off by uneven terrain or by the lean of the vehicle around corners, resulting in excess tire wear.

The patent fails to provide a solution for transmission of power to a sprung, transverse axle because the wheel axles disclosed in the patent are fixed relative to the hull. The patent also fails to teach that power for marine propulsion can be taken off one end of an engine while power for land propulsion is taken off the rear end of the engine. The patent shows that power for marine transmission is taken off downstream of the automotive transmission; thus, there is no way to disengage the wheel drive when operating in the marine mode.

SUMMARY OF THE INVENTION

The present invention provides a mobile home for use on both land and water without the need for a trailer and a towing vehicle. The appearance of the vehicle of the present invention is that of a luxury vehicle aesthetically at home whether on land or in the water. None of the conveniences of a motor home or house cruiser need be overlooked when outfitting the vehicle of the present invention.

The foregoing advantages of the present invention are realized by incorporating the following features in an amphibious vehicle:

1. The use of fully retractable wheels.
2. No mechanical automotive parts below the waterline to cause drag or corrosion.
3. The use of sliding hatch panels over the rear wheel walls to create a streamlined hull undersurface and to increase the buoyancy of the hull.
4. The use of a center floating power transfer mechanism for the wheel drive system.
5. The use of safety interlocks to assure that the vehicle wheels are not accidentally retracted while the vehicle is operating on land.
6. The use of a single steering column for steering the automotive wheels and the rudder of the marine outdrive.
7. The use of a single power source which operates the vehicle either on land or water.
8. The use of retraction arms which provide support to hold wheel supports in vertical positions while at the same time allowing vertical movement of the wheel supports to adjust to terrain changes.
9. The placement of the power transmission mechanism in front of the drive axle for maximum cabin space.

The amphibious vehicle of this invention has specific features which solve the problems of achieving adequate interior space while optimizing the performance of the vehicle whether used on land or water. The vehicle has a hydrodynamically clean hull when the vehicle is in a marine mode. The hull also provides a degree of monocoque construction so that the inside, usable dimensions of the vehicle can be maximized while the weight of the vehicle is kept to a minimum and the vehicle has a high degree of stability.

The vehicle uses a rear-mounted engine operable to drive the front wheels thereof. This allows the engine to be kept under a rear deck for optimum weight distribution and space utilization. The front drive axle mechanism is positioned under the driver's seat, front drive being essential for easy egress from the water.

The invention incorporates a special drive train that uses power from the normally front end of the engine to operate the marine outdrive while using normal power takeoff from the normally rear end of the engine to drive the front wheels. The drive train for the wheels is unique in that it incorporates a "floating" chain case to transfer power from the engine drive shaft to the front wheels. This chain case not only allows the engine drive shaft to be kept relatively low in height, but it also keeps the vertical movement of the drive shaft much less than that of the front axle, such as when a wheel stikes a bump or enters a depression in the road. This feature further reduces the floor height requirements of the vehicle.

The chain case also eliminates the need for a slip-joint in the drive shaft because the chain case can move as required to adjust for changed in length of the drive shaft. The chain case is supported and pivoted at its center of gravity (with the drive shaft attached) so that no unsprung weight is added to the front wheel axles when the latter are in their neutral positions, thereby eliminating the potential load on the differential bearings coupled to such axles.

Four wheel supports or "legs" are used to connect the front and rear wheels to the front and rear axles. During land operation, each wheel support is held in its vertical, operative position with a shiftable linkage capable of rotatably retracting the wheel support after the vehicle has been driven into the water. The linkages are locked in place individually by interlock means, such as shiftable pins passing therethrough. The shifting of the linkages causes up and down movement of the wheel supports and the linkages are operated by a hydraulic system forming part of a control circuit for the vehicle. The wheel supports are rotatably mounted on the axle ends by means of special retaining bearings which allow normal small rotational movements of the wheel supports as the wheels move over the road, yet allow for rotation through a predetermined arc when the wheels are retracted into respective wheel wells.

All perforations through the hull to accommodate the axles are above the normal waterline of the vehicle so that the wheels, when fully retracted, are substantially completely above athe waterline. The front wheels retract forwardly and upwardly to provide for a maximum of usable space in the vehicle behind the driver and to allow the maximum forward hull surface. The rear wheels retract rearwardly and upwardly also to provide for maximum cabin space. Sliding hatch covers or panels removably close the bottoms of the rear wheel wells when the rear wheels are retracted. This feature maintains smooth hydrodynamic lines on the bottom of the hull of the vehicle when used on the water so that optimum speed may be obtained. The rear wheel wells are self-bailing as the boat speed increases so that the effective weight of the vehicle is reduced, again for maximum performance.

The steering linkage coupled to the front wheels allows for wheel retraction. To this end, a shaft projects from the top of the steering knuckle near the wheel, and a universal joint and a bearing change the shaft direction to vertical. A steering arm is pinned to the top of the shaft in line with the center of rotation of the axle. This allows the wheels to be retracted into their wheel wells only when they are aligned for straight-forward movement of the vehicle.

An electrical interlock is provided so that such retraction cannot occur unless the front wheels are aligned in their straight-forward positions. The balance of the steering linkage consists of conventional elements including a tie rod, a bellcrank and a drag link. However, two bearings are provided to prevent the steering arm ball joint from turning when the wheels are retracted. Without these bearings, the wheels could tip outwardly while being retracted.

The marine steering mechanism has uniquely been incorporated into the automotive steering column. A hydraulic four-way valve is linked to the marine steering yoke by means of a flexible cable and is also linked to the outdrive steering arm or tiller by a connecting link. The valve operates a double-acting cylinder at the rear of the vehicle which, in turn, positions the outdrive steering arm or tiller. Hydraulic power is obtained from the aforesaid hydraulic system.

The front drive axle is suspended cantilever style from the rear ends of a pair of standard half-eliptical leaf springs. This allows maximum utilization of space behind the driver and avoids the necessity for any spring support structure on top of the front axle where it would further increase the seating height of the driver. The center of each spring is pivotally mounted to the vehicle frame so that the full benefits of the spring length may be obtained. The leaf spring also acts as an effective stabilizer to prevent suspension side-sway around corners. Rigid tie rods are attached to the axle to keep the differential in a horizontal position at all times.

The hydraulic system utilizes a single hydraulic pump as the main source of hydraulic power. The vehicle's automotive power steering operates from this system when the vehicle is on land and other hydraulic subsystems operate when the vehicle is in water including boat steering, wheel retraction, wheel extension and locking. The outdrive power tilt and trim tab operations are also included optionally.

Electrical interlocks are provided to perform the following functions:

1. To prevent all wheels from unlocking and retracting on land (a buzzer system is incorporated to indicate failure of any lock).

2. To prevent all wheels from unlocking and retracting unless the front wheels are in straight-forward positions and unless the automotive transmission is in neutral.

3. To prevent energizing the marine transmission on land. Also, the marine transmission shifts into neutral automatically when weight is transferred to the rear wheels as the vehicle leaves the water.

4. To raise the outdrive automatically when weight is transferred to the front wheels as the vehicle leaves the water.

5. To sequence unlocking, retracting and hatch panel movement operations to prevent damage due to improper sequencing.

6. To prevent any other use of the main hydraulic power system on land except for automotive steering. (this main hydraulic power system is separate from and is independent of the hydraulic brake system of the vehicle)

While the present invention is particularly applicable to amphibious motor homes, it is also applicable to other amphibious uses such as tour buses, commercial transportation vehicles and the like. Thus, it is not to be restricted to amphibious motor home use.

The primary object of this invention is to provide an improved amphibious vehicle suitable for use as a mobile home either on land or on water wherein the vehicle has aesthetic and mechanical qualities rendering the same suitable for the consummer market as distinguished from military purposes.

Another object of this invention is to provide a vehicle of the type described which has an improved power transfer mechanism for coupling the engine thereof to a ground-engaging wheel assembly thereof to permit the vehicle to move over different types of terrain without incurring structural damage yet the vehicle can be readily steered over land notwithstanding the fact that the drive wheel assembly is retractable when it is desired to use the vehicle for marine use.

A further object of this invention is to provide a vehicle of the aforesaid character which has a number of safety interlock devices which assures against accidental raising or lowering of the front and rear wheel assemblies and to assure that the raising and lowering thereof occurs in a proper sequence to eliminate sturctural damage to the vehicle regardless of its operation on land or on water.

Other objects of this invention will become apparent as the following specification progresses, reference being had to the accompanying drawings for an illustration of the invention.

Figure 1:
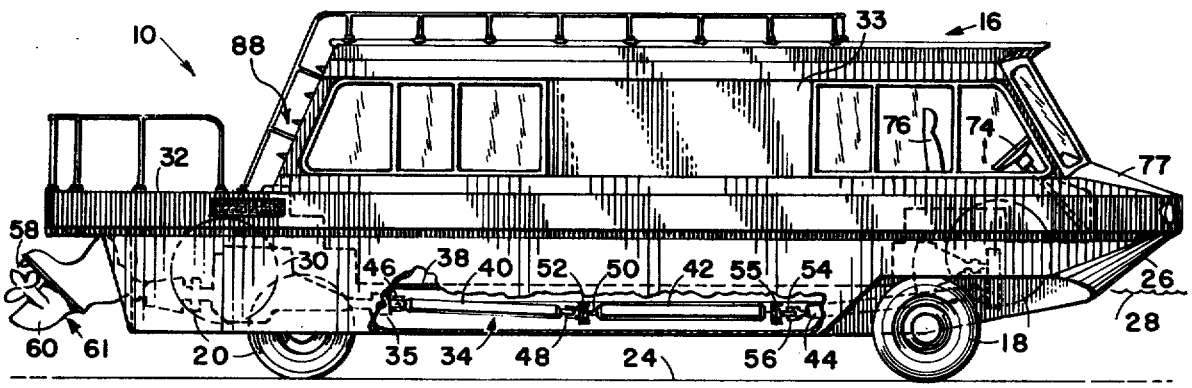
FIG. 1 is a vertical cross section through the vehicle of the present invention showing its outline with the front and rear wheels being shown in phantom and much of the front and rear internal construction being omitted for simplicity.
Figure 2:
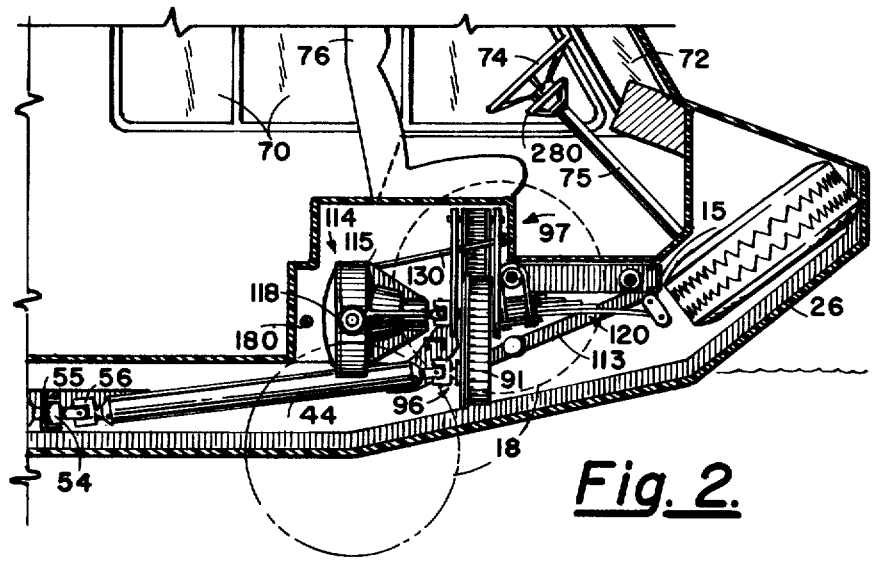
FIG. 2 is a view similar to FIG. 1 but showing the front half of the vehicle in greater detail.

The amphibious vehicle of the present invention is shown in vertical section in FIG. 1 and is broadly denoted by the numeral 10. It includes a frame 12 (FIG. 10) having a pair of spaced, longitudinally extending, fore-and-aft frame members 14 (FIG. 10) interconnected at their forwardmost ends by a front crossbeam 15 and interconnected near the center of the vehicle by a crossbeam 17. A hollow body 16 is mounted on frame 12 and can be supported for movement over a surface 24 by a pair of front wheels 18 (FIGS. 1, 2, 4, 9, 11 and 12) and a pair of rear wheels 20 (FIGS. 1, 3 and 5–8) when the wheels are in their lowered, ground-engaging positions. Body 16 has a pair of front wheel wells 21 (FIG. 4) and a pair of rear wheel wells 23 (FIGS. 5 and 6) into which corresponding front and rear wheels can be elevated. In their elevated positions (FIGS. 4 and 5), the front and rear wheels are retracted above the bottom of body 16, whereby the lower portion 26 of the body defines a buoyant hull movable through water, the normal level of which is denoted by the numeral 28, FIGS. 1 and 8. Vehicle 10 is constructed so that at least the major portions of the front and rear wheels, in their retracted positions, are above water level 28. This feature assures that there will be substantially no water damage to the various moving parts of the wheels and the structure for raising and lowering the same.

The vehicle has a front-wheel drive system powered by an internal combustion engine 30 disposed within a housing 32 at the rear of body 16 behind the passenger cabin 33 thereof. Motor 30 has a transmission 35 connected to the rear end of an articulated drive shaft 34 whose front end is coupled to a power transfer mechanism 36 (FIGS. 9–12) by means of which energy due to rotation of drive shaft 34 is transferred to front wheels 18 for driving the same forwardly or in reverse.

Drive shaft 34 is rotatably mounted on frame 12 and is disposed below the floor 38 (FIG. 1) of body 16. It is comprises of a number of shaft sections 40, 42, and 44 (FIG. 1) arranged in end-to-end relationship with each pair of adjacent sections and being interconnected by universal joints. A U-joint 46 connects the front end of transmission 35 with the rear end of shaft section 40; a U-joint 48 connects the front end of section 40 with the rear end of shaft section 42 through a bearing 50 carried by a crossbeam 52 connected to and extending between frame members 14. Similarly, a bearing 54 carried by a crossbeam 55 connects the front end of shaft section 42 through a U-joint 56 to the rear end of section 44. Shaft section 42 is generally horizontal; whereas, shaft sections 40 and 44 are slightly inclined rearwardly and forwardly, respectively, as shown in FIG. 1.

Engine 30 is also utilized to power a marine outdrive 61 having a propeller 58 at the rear, lower end of a rudder 60 shiftably carried on a transom 62 (FIG. 3) at the rear of housing 32. Outdrive 61 is connected by a marine transmission 64 to the drive shaft of engine 30 and is pivotally mounted on transom 62 for movement about a horizontal axis from the full-line position of FIGS. 1 and 3 at which it is operative relative to moving the vehicle through the water to an elevated, retracted position shown in dashed lines in FIG. 3, the position it normally occupies when the vehicle is movable over a surface 24. A flexible boot 66 (FIG. 3) permits outdrive 61 to be raised and lowered, yet the junction between it and transom 62 is sealed to prevent the flow of water into housing 32.

Engine 30 is cooled by a radiator 67 disposed rearwardly of fans 69 coupled by belt means 71 to the motor drive shaft. The engine has suitable air inlet and exhaust openings to assure proper operations thereof. Also, a fuel tank (not shown) carried by frame 12 provides a fuel supply for the engine.

The interior of body 12 can be of any suitable construction. The body has several windows 70 on the sides thereof and a windshield 72 at the forward end in front of a steering wheel 74 behind which is a driver's seat 76. A forward storage compartment can be used to stow equipment, such as a spare tire, tools and the like. The rear wall 88 can include a sliding glass door 89 (FIG. 3) to permit entry onto a rear deck 90 which can be provided with an outer peripheral railing. Retractable stairs (not shown) at the rear of housing 32 permits entrance to the deck from the rear of the vehicle. Other interior accessories can be provided for body 12, if desired.

Figure 9:
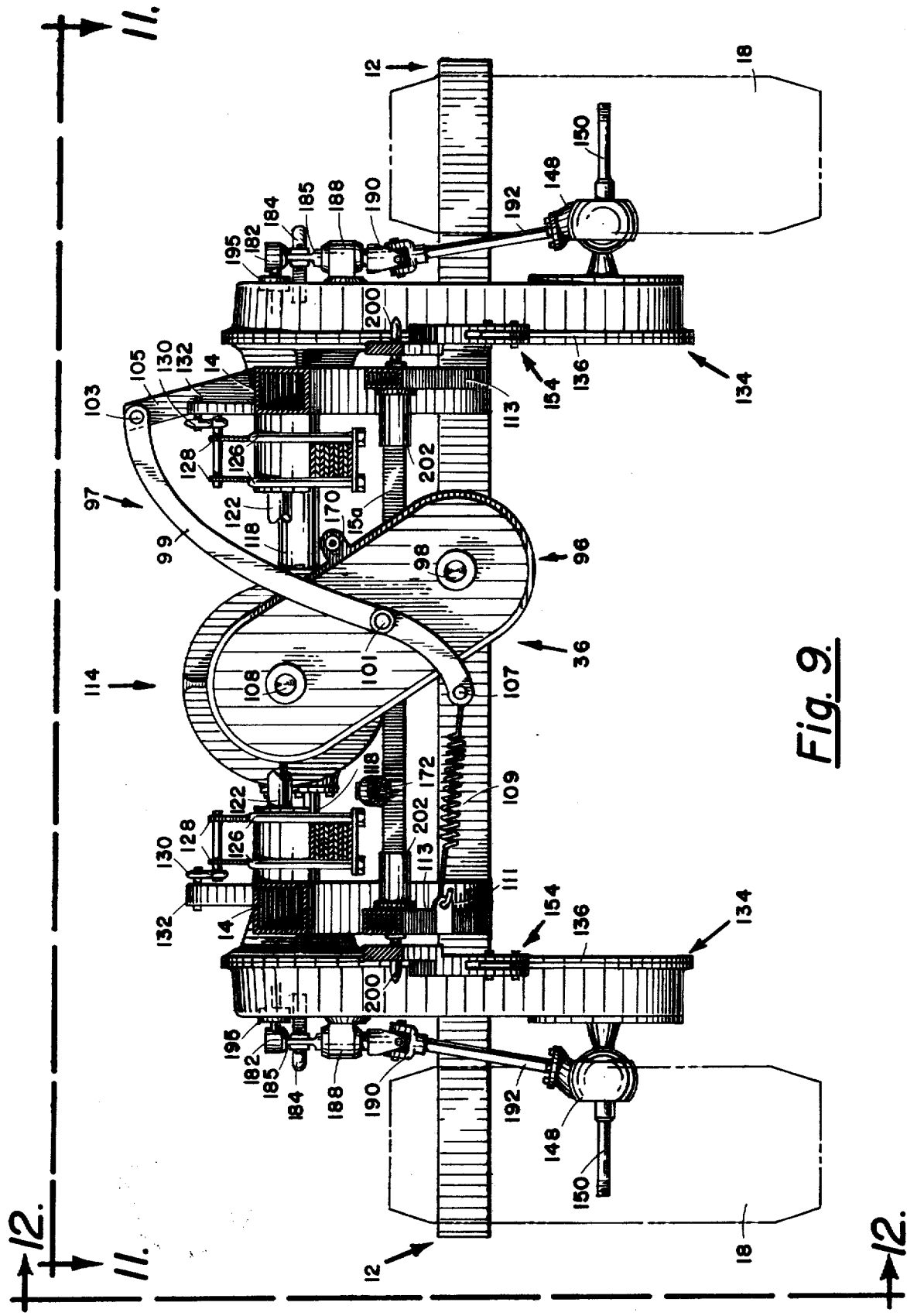
FIG. 9 is an enlarged, front elevational view of the front wheel mounting structure and power transfer means therefor with the two front wheels shown in phantom and in their lowered positions.

The front wheel mounting structure and its connection with power transfer mechanism 36 are shown in detail in FIGS. 9–13. Mechanism 36 includes an elongated, closed hollow chain case 96 having a first rotatable shaft 98 which projects outwardly and rearwardly therefrom and is connected by a universal joint 100 to the forward end of drive shaft 34, specifically to section 44 thereof. Chain case 96 has a lower sprocket 102 therein which is rigid to shaft 98 and is coupled by a Morse HI-VO chain 104 (FIG. 15) to an upper sprocket 106 rigid to a second rotatable shaft 108 which projects outwardly from and rearwardly of the chain case parallel to first shaft 98. First shaft 98 is below and at one side of shaft 108 as shown in FIG. 9.

Shaft 108 is coupled by a universal joint 110 to the front end of a shaft 112 (FIGS. 10 and 11) forming a part of a differential 114. The rear end of shaft 112 is disposed within the gearing housing 115 of differential 114 and is coupled by spiral beveled gears (not shown) to a pair of side shafts 116 (FIG. 11) rotatable within tubular differential axle sections 118 which are rigid to gear housing 115.

Figure 10:
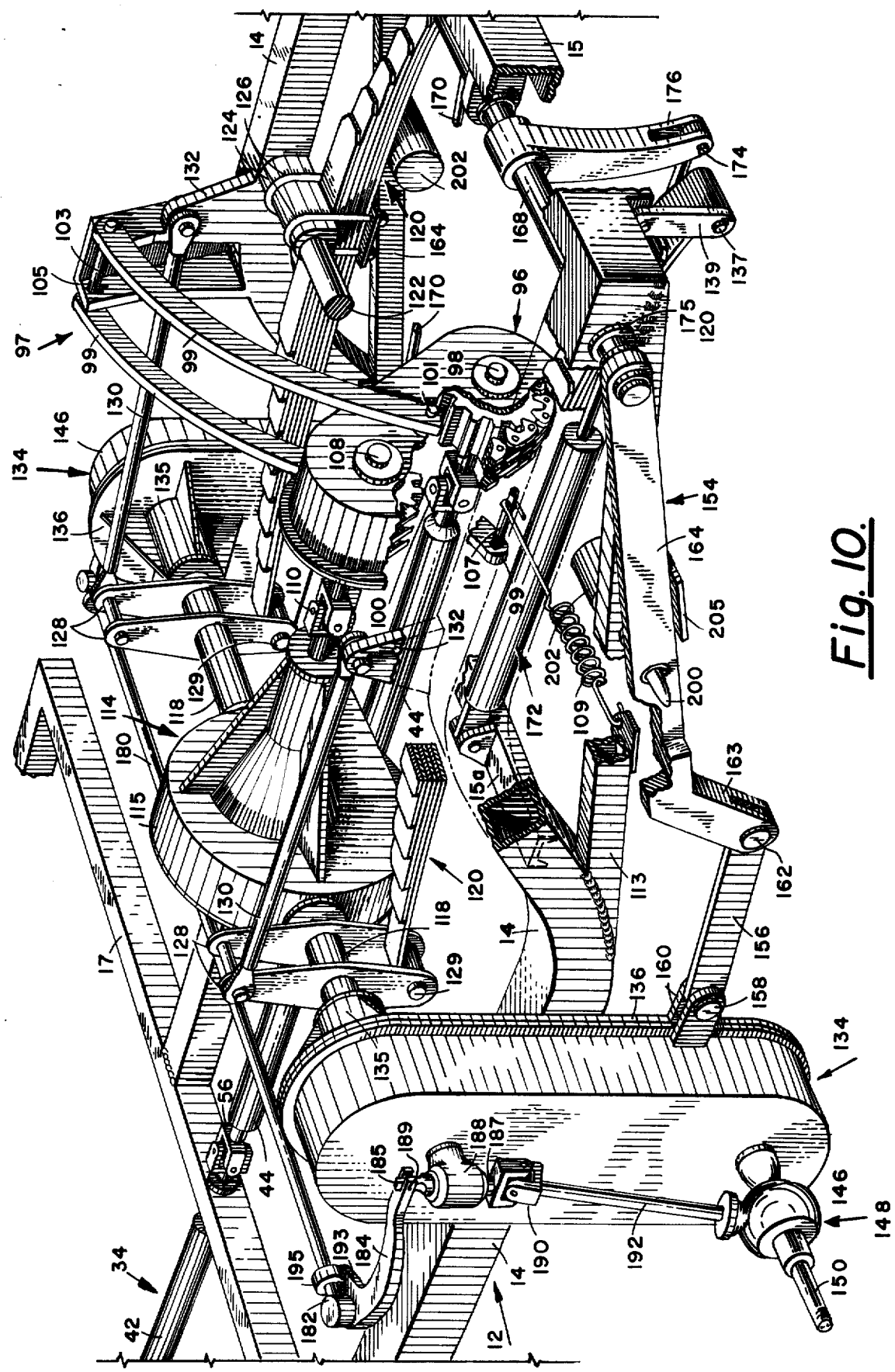
FIG. 10 is a perspective view of the mounting structure and power transfer means of FIG. 9, parts being broken away to illustrate details of construction.

Chain case 96 is coupled by a yoke 97 to one of the frame members 14 and up and down movement with respect thereto. To this end, yoke 97 has a pair of curved, rigid members 99 pivotally connected intermediate their ends by respective pins 101 to the front and rear faces of chain case 96. The upper ends of members 99 are pivotally connected by pins 103 to the upper ends of a pair of spaced, rigid legs 105 secured to and extending upwardly from the adjacent frame member as shown in FIG. 10. The lower ends of members 99 are interconnected by a rigid link 107. One end of a coil spring 109 (FIG. 10) is hooked over link 107 and the opposite end of spring 109 is secured to a bracket 111 rigid to a lower frame extension 113 rigid to and extending longitudinally of the adjacent frame member 14. Spring 109 balances the full weight of chain case 96 at its equilibrium position (the full-line position of FIG. 9) and the chain case can pivot above or below such position through a limited arc about the common axis of pins 103. Another position of the chain case when it is displaced is shown in dashed lines in FIG. 14.

Figures 13, 14, 15, 16:
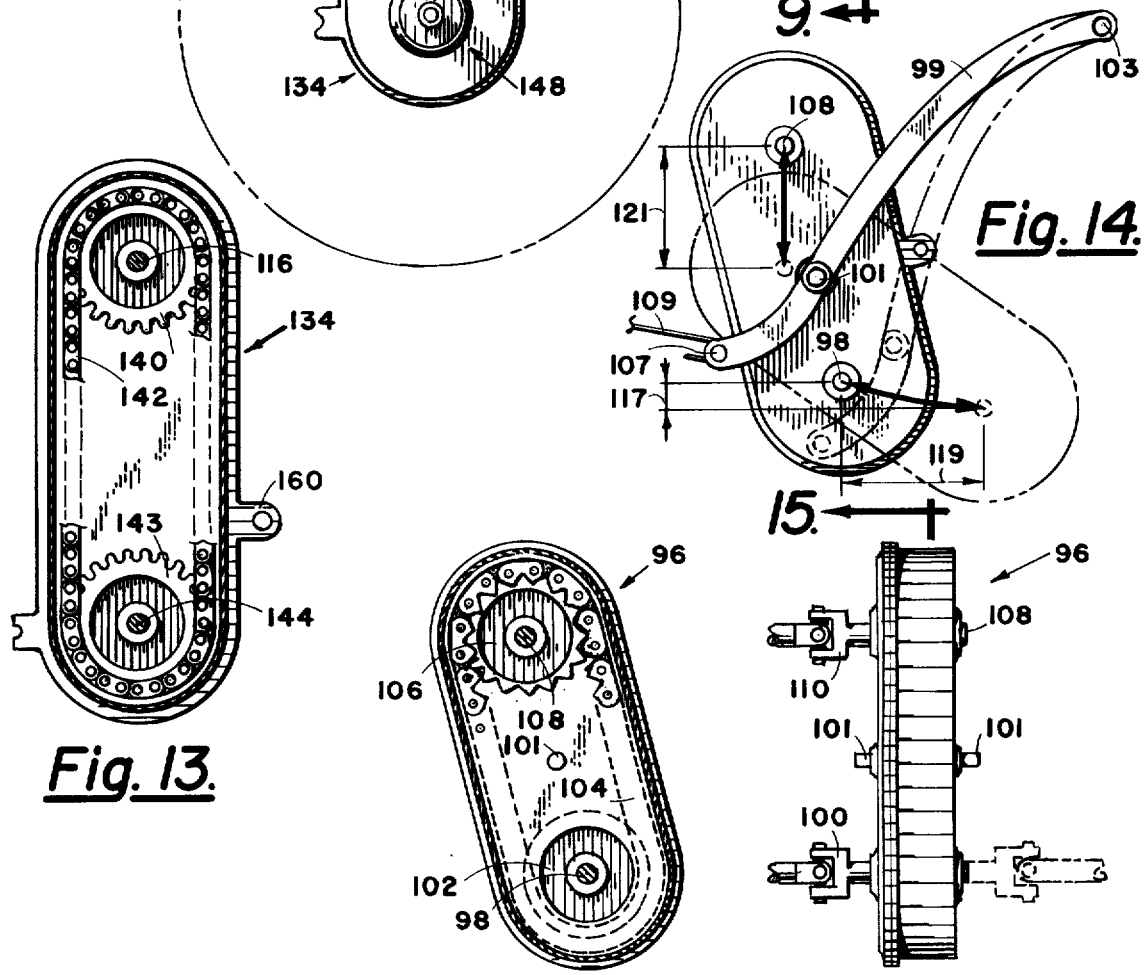
FIG. 13 is a vertical cross section through a chain case used to mount and to drive one of the front wheels.
FIG. 14 is a schematic view of the power transfer chain case coupled to the vehicle drive shaft, illustrating two different operative positions of the chain case.
FIG. 15 is a vertical section through the chain case of FIG. 14 and looking in the direction of line 15—15 of FIG. 14.
FIG. 16 is a side elevational view of the chain case of FIG. 15.

FIG. 14 illustrates the way in which the chain case 96 can pivot downwardly, for instance, causing a relatively small change in the height of shaft 90 for a relatively large change in the height of shaft 108. Shaft 108, because it is connected to universal joint 110, can pivot downwardly through a distance 121 as shaft 98 moves downwardly through a distance 117. The lateral displacement of shaft 98 is denoted by the numeral 119 and corresponds to the vertical distance 117. Thus, there is minimum vertical displacement of drive shaft section 44 for any up and down movement of the chain case. Thus, the drive shaft can be safely accommodated under floor 38 without interference therefrom. Moreover, universal joint 110 permits shaft 108 to pivot through a relatively large arc since chain case 96 is properly supported at all times by yoke 97.

A stabilizing rod 170 (FIGS. 10–12) having ball joints (not shown) at its ends operates to pivotally interconnect chain case 96 and crossbeam 15. Rod 170 prevents rotational movement of chain case 96 relative to frame 12 about an axis through universal joints 100 and 110.

Figure 11:
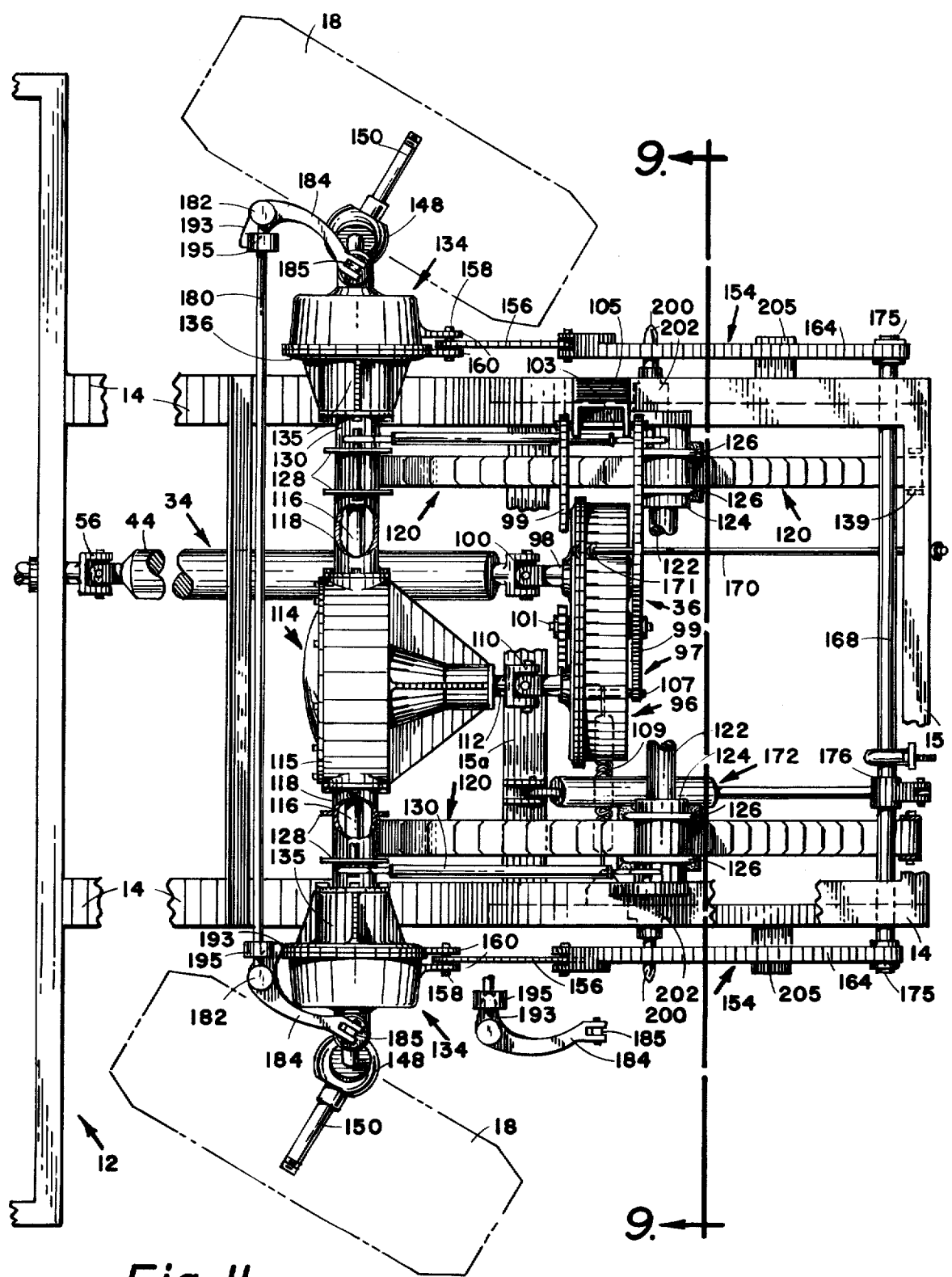
FIG. 11 is a top plan view of the structure of FIGS. 9 and 10.

Axle sections 188 are secured to, supported by, and disposed above the rear ends of respective leaf springs 120 which are generally parallel with each other and extend fore and aft of the vehicle between frame members 14. Each spring 120 is pivotally coupled to the adjacent frame member 14 by a bearing block 124 secured to the midpoint of the spring by a pair of U-bolts 126 and pivotally mounted on a shaft 122 projecting laterally between frame members 14, shaft 122 being broken away as shown in FIGS. 9–11. A pair of parallel, rigid tie-down plates 128 rigidly secured intermediate their ends to each axle section 118, respectively, are pivotally secured at their lower ends by a pin 129 to the rear end of a respective spring 120. A stabilizer rod 130 pivotally connected at one end thereof to the upper end of one of the tie-down plates 128 is pivotally connected at its forward end to an ear 132 rigid to and extending upwardly from the corresponding frame member 14. Thus, the rear half of each spring 120 and its corresponding stabilizer rod 130 form parts of a parallelogram to effectively stabilize axle sections 118 and to keep differential 114 essentially horizontal as it moves up and down relative to frame 12.

The front end of each spring 120 is pivotally connected by a pin 137 (FIGS. 10–12) to the lower ends of a pair of spaced arms 139 pivoted from and extending downwardly from crossbeams 15. Thus, springs 120 are effectively cantilevered with respect to frame 22.

A pair of sealed, hollow chain cases 134 are rotatably coupled by bearings 135 to the outer ends of respective axle sections 118. Each chain case 134 comprises a support or "leg" for mounting a corresponding front wheel 18 for movement relative to frame 12 from its lowered, ground-engaging position to its elevated, retracted position and return. To this end, bearings 135 are carried by the inner walls 136 of respective chain cases 134 and permit rotational movement thereof relative to axle sections 118.

Each chain case 134 (FIG. 13) includes an upper sprocket 140 rigid to the adjacent side shaft 116 of differential 114. An endless, flexible link chain 142 couples upper sprocket 140 with a lower sprocket 143 rigidly secured to a rotatable shaft 144 which projects through the outer panel 146 of the chain case.

A ball joint 148 defining a steering knuckle is coupled to the outer end of stub shaft 144 and a shaft 150 is rigid to and extends outwardly from the ball joint. A wheel 18 is rotatably mounted on shaft 150 in any suitable manner. Ball joint 148 permits the rotation of shaft 144 to be imparted to shaft 150 while shaft 150 is rotatable relative to shaft 144 about a generally vertical axis through the ball joint to allow for steering of the vehicle.

Each chain case 134 is raised and lowered by rotation of a shaft 168 (FIGS. 10–12) coupled by an articulated linkage 154 to the chain case. A fluid piston and cylinder assembly 172 effects rotation of shaft 168 alternately in opposed directions.

Eack linkage 154 includes a first link 156 pivotally coupled at its rear end by a pin 158 to a pair of spaced ears 160 rigid to and extending from the corresponding chain case 134. The forward end of link 156 is pivotally connected by a pin 162 to an offset portion 163 at one end of a second link 164 rigidly connected at its forward end to shaft 168, the latter being rotatably mounted by bearings 175 in the front ends of frame members 14 immediately rearwardly of crossbeam 15.

Means for simultaneously rotating linkage 154 about shaft 168 includes a power device comprises of a piston and cylinder assembly 172 pivotally connected at one end by a pin 174 to the lower end of an arm 176 (FIGS. 10–12) rigid to shaft 168 intermediate frame members 14. The opposite end of assembly 172 is rigidly secured to a crosspiece 15a rigid to and spanning the distance between frame members 14 below springs 120 and rearwardly of shaft 122. When chain cases 134 are in their lowered positions (FIGS. 10 and 12), assembly 172 is in an extended condition, i.e., the piston thereof is near the forward end of the cylinder.

Figure 12:
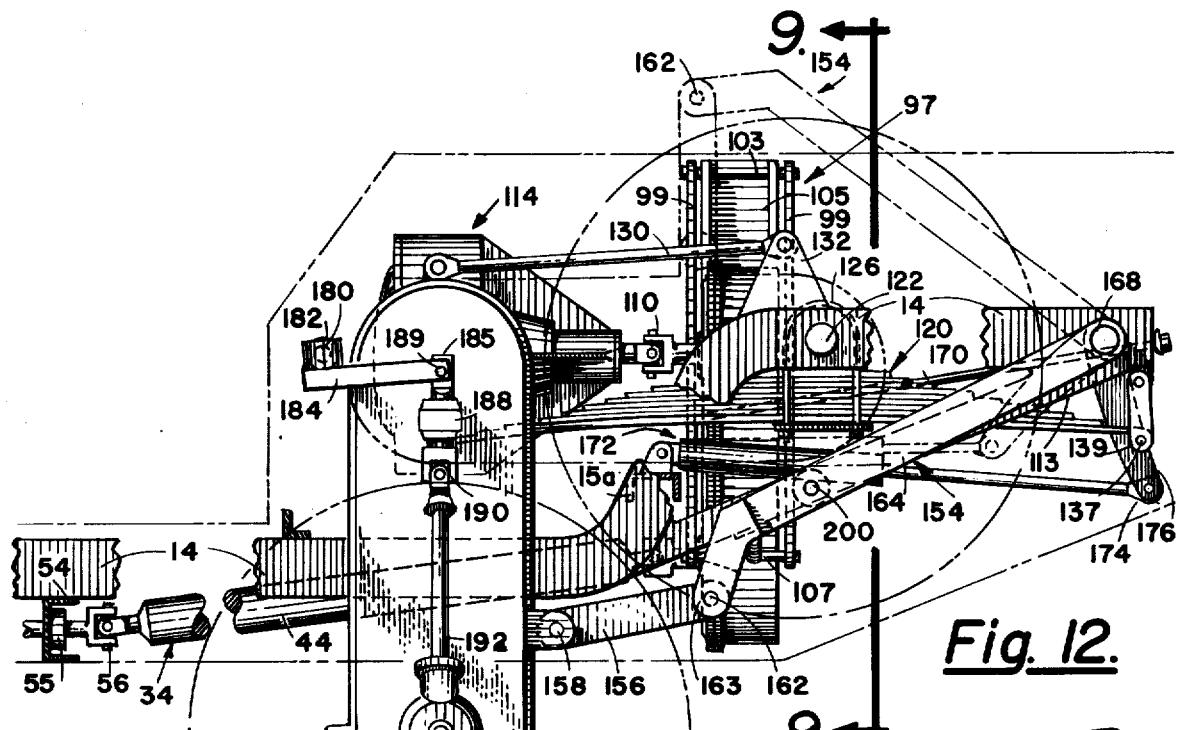
FIG. 12 is a side elevational view of the structure of FIGS. 9-11.

When assembly 172 is actuated, shaft 168 is rotated in a clockwise sense when viewing FIGS. 10 and 12 causing links 164 of linkage 154 to pivot upwardly therewith, carrying corresponding links 156 in an upward direction. This causes chain cases 134 to pivot forwardly and upwardly about the axis of axle sections 118 and into elevated, retracted positions shown in full lines in FIG. 4. In such positions, links 156 extend almost vertically and link 164 is in an inclined position, such as about 45° relative to the vertical.

Figure 4:
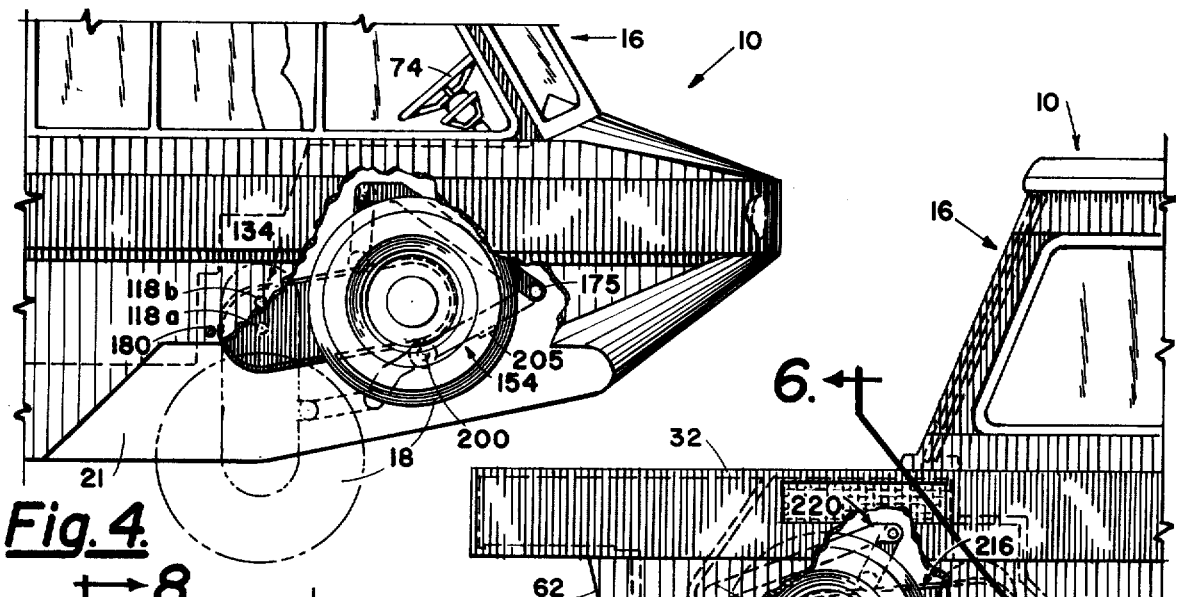
FIG. 4 is a fragmentary, side elevational view of the vehicle, showing the front end thereof partially broken away to illustrate the corresponding front wheel well and the corresponding front wheel in a retracted position therein.

As shown in FIG. 4, each chain case 134 rotates about an axis 118a which is below axis 118b of axle sections 118 when front wheels 18 engage the ground. This is due to the fact that springs 120 are sprung upwardly since the weight of body 12 is on the front wheels. When the vehicle moves into the water, the front wheels no longer support the body and chain cases 134 sag due to the return of springs 120 to their unsprung positions so that the axis of axle sections 118 moves downwardly into position 118a.

Steering of the front wheels is accomplished by movement of a tie rod 180 disposed rearwardly of differential 114. Rod 180 is mounted on frame 12 in any suitable manner for left and right transverse movement and is adapted to be connected in a conventional manner, such as by a bellcrank (not shown), to the steering column 75 of steering wheel 74. Thus, as the steering wheel 74 is rotated to the left, rod 180 moves to the right when viewing FIG. 11 to cause rotation of front wheels 18 to the left.

Each end of rod 180 is coupled to a ball joint 182 on the rear end of an arm 184 whose forward end is slotted to receive the upper end 185 of an extension shaft 187 rotatably carried in a sleeve 188 rigid to outer panel 146 of chain case 134. The opposed sides of upper end 185 are flat and a pin 189 (FIG. 12) pivotally interconnects arm 184 and upper end 185. When the front wheels are aligned for straight-forward movement, each pin 189 is coincident with the axis of axle sections 118.

A universal joint 190 secured to the lower end of shaft 187 is coupled to the upper end of a rigid link 192 whose lower end is connected to the rotatable part of ball joint 148. As arm 184 rotates about its vertical axis (not shown), it causes rotation of shaft 187 relative to sleeve 188 and thereby rotation of shaft 150 about the vertical axis of rotation of ball joint 148.

The slots in the forward ends of arms 184 allow chain cases 134 to pivot upwardly and into their retracted positions without pivoting arms 184. However, the front wheels must be aligned for straight-forward movement during retraction, i.e., pins 189 must be coincident with the axis of axle sections 118 to prevent structural damage to the steering system. Also, the tendency for a front wheel 18 to lean outwardly during elevation of the corresponding chain case 134 is prevented by utilizing a lateral projection 193 near the rear end of each arm 184, respectively. Each projection 193 underlies and engages a roller 195 carried on the corresponding end of the rod 180, thereby preventing any tendency for arm 184 to rotate about a fore-and-aft axis therethrough such as when an unbalanced force on extension 185 (due to a front wheel tending to lean to one side) causes it to twist in the forward slot of arm 184.

Means for locking each linkage 154 in its down position (FIGS. 10 and 12) includes a shiftable pin 200 forming a part of a fluid piston and cylinder assembly 202 carried by the adjacent frame extension 113, FIGS. 10 and 11. Each link 164 has a hole therethrough for receiving pin 200, the hole being movable into alignment with the pin as linkage 154 approaches its lowered position as the corresponding chain case 134 is lowered from its retracted position. The pin is retracted or moved into its cylinder when fluid flows in one direction thereinto and the pin is outwardly of the cylinder into an extended position when fluid flows into the cylinder from the opposite end thereof. A single solenoid-actuated valve 203 controls the operation of assemblies 202 of both pins 200.

Pins 200 also provide safety devices when chain cases 134 are in their elevated positions (FIG. 4). In such a case, pins 200 are again extended and underlie respective chain cases 134 as shown in FIG. 4 to thereby prevent downward movement of the same until the pins are again retracted.

A rigid plate 205 (FIGS. 4, 10 and 11) is provided for each linkage 154, respectively. Each plate 205 is secured to and extends laterally from frame 12 at a location below the position occupied by link 164 of the corresponding linkage 154. Plate 205 serves to position link 164 so that its hole will be aligned to receive the corresponding pin 200. To this end, link 164 engages plate 205 when linkage 154 is in its lowered position.

Since chain cases 134 are disposed in the front wheel wells of vehicle 10, means must be provided to seal the interior of body 12 yet allow connections to be made between differential 114 and chain cases 134. To this end, flexible boots (not shown) surrounding axle sections 118 inboard of bearings 135 are provided to cover the holes through which the axle sections pass, such holes being of sufficient size to allow vertical movements of the axle sections, such as when the front wheels move over bumps or into ruts. Also, a pair of side seals are provided for the ends of rod 180 to permit the same to move laterally to steer the front wheels.

Figure 3:
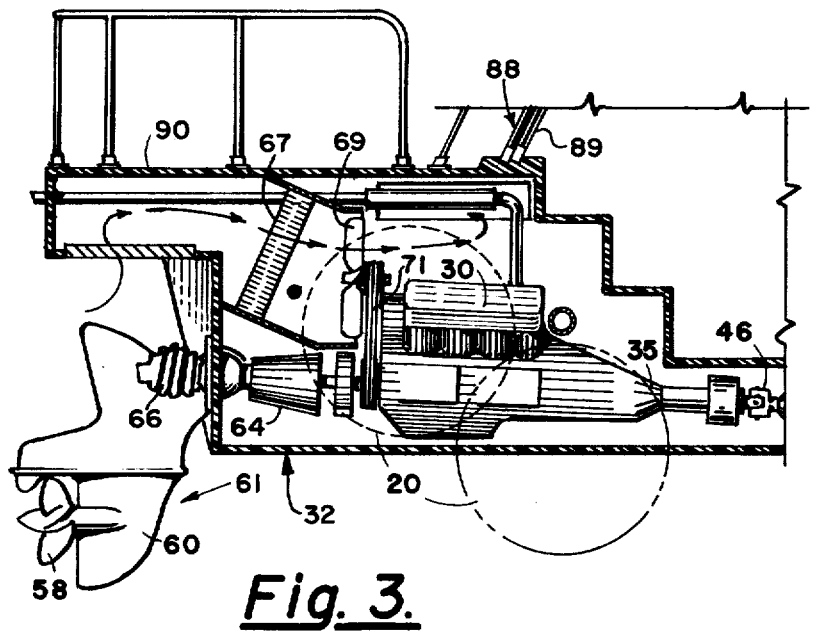
FIG. 3 is a view similar to FIG. 2 but showing the rear half of the vehicle in greater detail.

Each rear wheel 20 has a wheel support or leg 216 rotatably mounted on body 12 for movement from a lowered, ground-engaging position to an upper, retracted position and return. Each rear wheel and its support 216 are movable in the corresponding rear wheel well 23 by the action of a fluid piston and cylinder assembly 210 (FIG. 7) coupled to an arm 212 rigid to and extending from a horizontal shaft 214 rotatably mounted on frame 12 near the rear portions of rear wheel walls 23. Each rear wheel 20 is mounted for rotation on a fixed shaft carried at the lower end of the corresponding support 216. The upper end of each support 216 is rotatably mounted on a fixed axle 218 and coupled by suitable springs (not shown) to the frame 12 to permit up and down movement of the axis relative to the frame. FIG. 3 shows two different operative positions of axle 218, the lower position corresponding to the condition in which the rear wheels do not support body 12 and the upper position corresponding to a condition in which the rear wheels engage the ground and support the body. Axle 218 extends through a hole in each side of hull portion 26, each hole being sealed by a flexible boot 221 (FIG. 8) to seal the interior of body 12 from water in the adjacent rear wheel wall.

Figure 6:
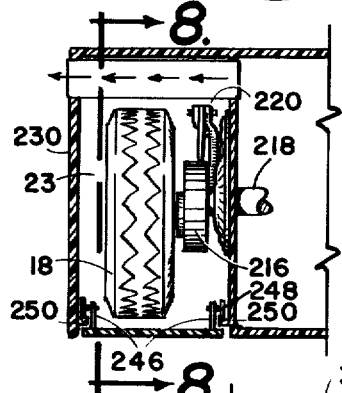
FIG. 6 is a fragmentary, cross-sectional view taken along line 6—6 of FIG. 5.
Figure 5:
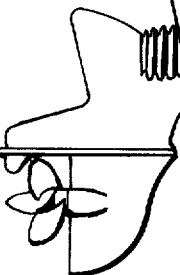
FIG. 5 is a view similar to FIG. 4 but showing the way in which a rear wheel is retracted in a rear wheel well of the vehicle.

An articulated linkage 220 is provided for raising and lowering each wheel support 216, respectively. Each linkage 220 includes a rear link 222 (FIG. 5) whose rear end is rigid to and extends forwardly from the proximal end of shaft 214, and a forward link 224 pivotally interconnecting the forward offset end of link 222 and the corresponding wheel support 216 near the lower end thereof. A rear wheel 20 is shown elevated into its upper position. In FIGS. 6 and 5. After being moved rearwardly and upwardly under the influence of the rotation of shaft 214 in a counterclockwise sense when viewing FIG. 5, each rear wheel is stopped and maintained in such elevated position.

Each linkage 220 is provided with a locking pin 265 substantially identical to and for the same purpose as locking pins 200 for front linkages 154. Pins 265 operate to enter respective holes in links 222 of linkages 220. A rigid plate 267 (FIG. 5) substantially identical to and for the same purpose as plates 205 is provided for each linkage 220, respectively, each plate being rigidly secured to and extending laterally from frame 12 at a location below the lowered position of link 222 of the corresponding linkage 220.

Body 16 is provided with a side panel 230 (FIG. 7) which normally covers the lower, outer side portions of each rear wheel well 23. Panels 230 are individually removable so as to provide access to the corresponding rear wheels to change the wheels in the event of a flat tire or other malfunction.

Figure 7:
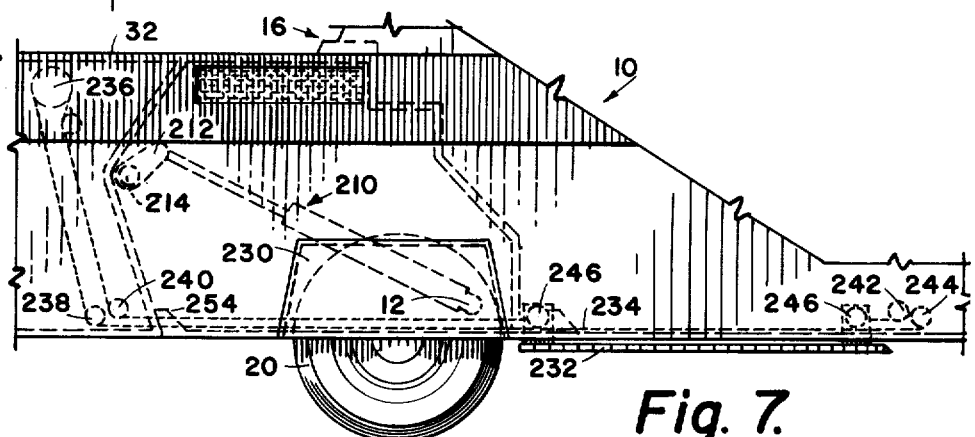
FIG. 7 is a fragmentary, side elevational view of the rear end of the vehicle showing a wheel well hatch panel in an open condition and the corresponding rear wheel in a lowered position.

Each rear wheel well 23 is removably covered at its bottom with a sliding hatch panel 232 which moves from a forward, hatch-open position shown in FIG. 7 underlying body 12 to a rearward, hatch-closed position vertically aligned with and covering the open bottom of the corresponding rear wheel well. To this end, an endless, flexible cable 234 coupled to a pulley system having a number of pulleys is provided for each hatch panel 232, respectively. The pulley system includes pulleys 236, 238, 240, 242 and 244 rotatable about respective horizontal axes and disposed in a common vertical plane. Each hatch panel 232 (FIG. 6) has a number of spaced, side brackets 246 rigid to and extending upwardly from the opposed side margins thereof, each bracket 246 having a small wheel 248 (FIGS. 6 and 7) which rolls in an upper groove on a lateral boss 250 carried by the adjacent wall structure of body 12.

When each hatch panel 232 is in its forward position, the plane of the panel is below the plane in which it is disposed when it closes the open bottom of the corresponding rear wheel well 23. To this end, the grooves receiving wheels 248 and bosses 250 rise in elevation near their rear ends. Thus, as the lower stretch of cable 234 moves to the left when viewing FIG. 7, each hatch panel 232 moves rearwardly with the cable until the forward extremity of panel 232 is aligned with an inclined shoulder 252 (FIG. 7) thereupon, continued movement of the hatch panel causing the panel to move upwardly and into closing relationship to the open bottom of the well. An inclined stretch 254 (FIG. 7) indicates the rise in elevation of the rear part of the groove in a boss 250, thereby indicating the way in which hatch panel 232 is elevated.

In its well-closing position, each hatch panel 236 underlies the adjacent bosses 250 thereabove (FIG. 6). A gasket is carried by the lower face of each boss to seal the junction between it and the hatch panel.

Figure 8:
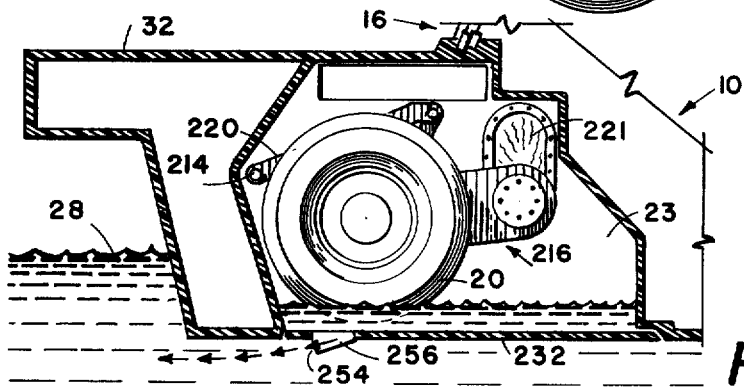
FIG. 8 is a view similar to FIG. 7 but showing the rear wheel in a retracted, elevated position and the wheel well hatch panel in a closed condition.

Each hatch panel 232 is provided with a rearwardly facing opening 254 therethrough formed by an outwardly and rearwardly extending shell 256. The purpose of this feature is to permit water in the rear wheel wall to be drawn out of the same by suction as the vehicle moves forwardly through the water when the corresponding rear wheel is retracted and when the hatch panel 232 covers the open bottom of the corresponding rear wheel well. The suction is created when water, moving rearwardly with respect to and below opening 254, creates a region of reduced water pressure near the opening to draw water out of the wheel well through the opening itself. In FIG. 8, the level of the water in a rear wheel well is shown below the normal water level 28 of the vehicle; thus a minimum amount of water in the rear wheel well will result, thereby maintaining the weight of body 12 to a minimum.

Cable 254 can be moved in either direction by a reversible motor 260 (FIG. 17) coupled in any suitable manner to the cable, such as by being coupled to the shaft of pulley 236 for each hatch panel 323, respectively. Thus, by energizing motor 260 in the proper manner, both hatch panels 232 can be made to move simultaneously forwardly or rearwardly.

Figure 17:
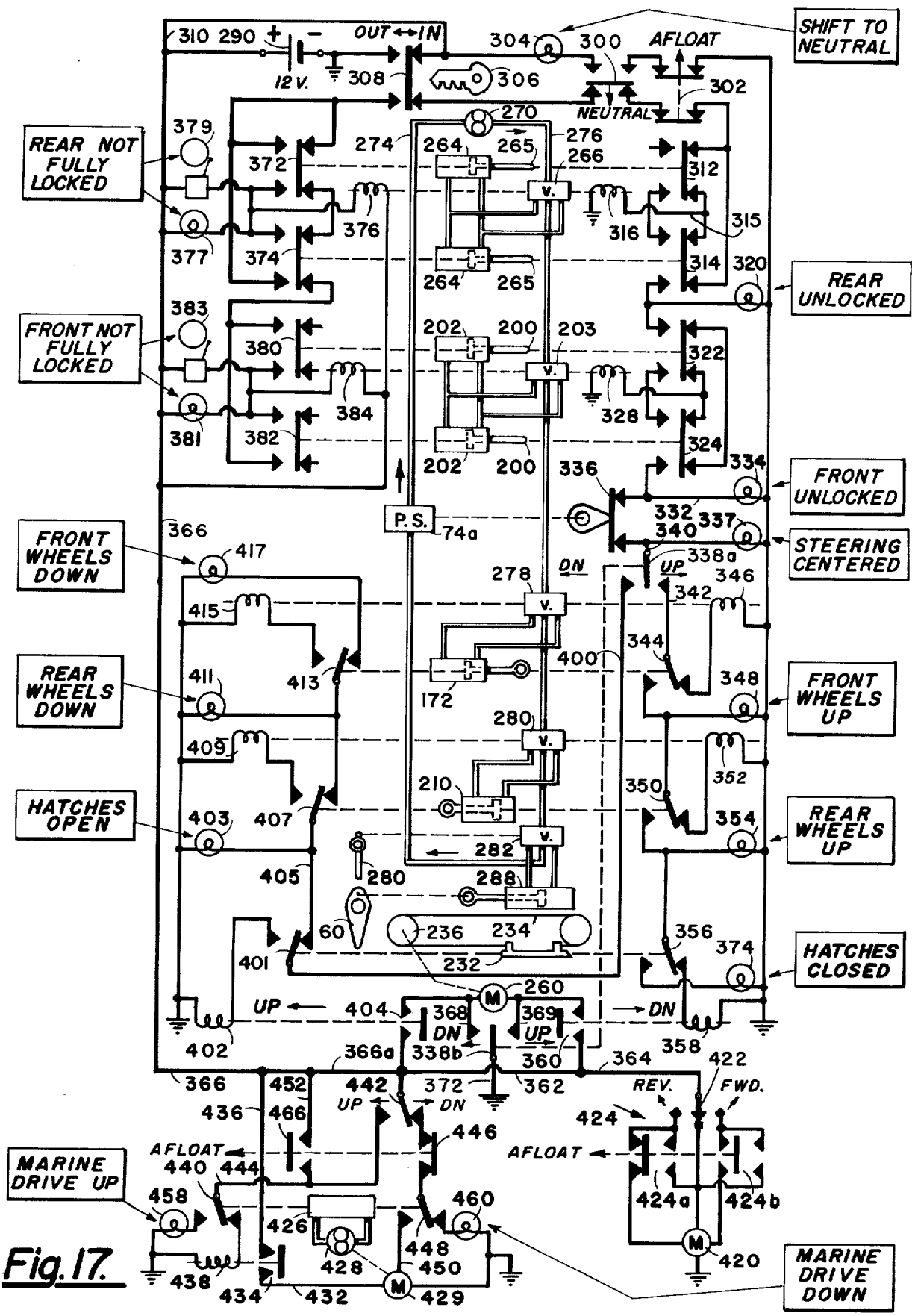
FIG. 17 is a schematic view of the control circuit for operating the various actuatable power devices of the vehicle.

FIG. 17 illustrates the control circuit for operating vehicle 10. The circuit utilizes a hydraulic pump 270 connected by pressure line 274 and return line 276 to the solenoid-actuated fluid valves 203 and 266 of assemblies 202 and 264 of lock pins 200 and 265 and to solenoid-actuated fluid valves 278 and 280 coupled to and operable to control fluid piston and cylinder assemblies 172 and 210 for raising and lowering the front and rear wheels, respectively. A manually actuated fluid valve 282 is in series with valves 203, 266, 278 and 280 and is controlled by a tiller 280 shiftably mounted on steering column 75 for operating a fluid piston and cylinder assembly 288 coupled to rudder 60 of outdrive 61.

Each fluid piston and cylinder assembly described above has a pair of limit switches which are actuated when the piston of the assembly reaches the respective, opposed ends of its path of travel. For instance, the upper assembly 264 (FIG. 17) has switches 312 and 372 coupled to its piston rod, each switch having a shiftable pole biased in a predetermined direction by a spring. Thus, when the piston is at the right end of the corresponding cylinder, the shiftable pole of each switch is in its right-hand position (FIG. 17) and when the piston is in the opposite end of the cylinder, the switch is in the left-hand position.

During operation of vehicle 10, even when its engine is merely idling, pump 270 is operating to pump fluid into line 276 and 264. Each of the four fluid valves 203, 266, 278 and 280 remain in a neutral position until it is pulsed and, upon being pulsed, moves into the corresponding operating position so that fluid enters the corresponding fluid cylinder. Then the limit switches return the valve to its neutral position until the next pulse.

A 12-volt battery 290 is utilized to provide a current source for the solenoid coils of fluid valves 203, 266, 278 and 280 and for supplying current to reversible motor 260 which opens and closes hatch panels 232.

OPERATION

For moving vehicle 10 over the road it will be assumed that the front and rear wheels are down and are locked by pins 200 and 265 (FIGS. 4 and 5) passing through front and rear wheel support linkages 154 and 222, respectively. In such condition, vehicle 10 can be driven in a conventional manner over the ground under the influence of engine 30 coupled by drive shaft 34 to the front wheels. Steering of the vehicle is effected by rotating steering wheel 74 which, through power steering unit 74a (FIG. 17) in return line 274, downstream of valve 282, tie rod 180 and the steering mechanism between rod 180 and ball joints 149, causes front wheels 18 to pivot about respective vertical axes through such ball joints.

When one of the front wheels moves over a bump, the wheel and its chain case move upwardly, causing the corresponding axle section 118 and differential 114 to pivot upwardly. Since the differential is connected by universal joint 110 to chain case 96, the chain case will also pivot upwardly relative to frame 12 about the common axis through pins 103 at the upper ends of yoke members 99 and relative to yoke 97 about the common axis through pins 101. This is shown in the left-hand dashed line of chain case 96 shown in FIG. 9. However, the lower shaft 98 of chain case 96 will only move up a relatively short distance, thereby keeping the vertical movement of the forward end of drive shaft section 44 at a minimum. Thus, drive shaft 34 does not impact with floor 38 of body 16.

If a front wheel falls into a rut in the road, the wheel and its chain case will move downwardly with respect to vehicle frame 12, causing the differential to move downwardly as well. This condition is illustrated in the right-hand dashed line of FIG. 14, wherein lower shaft 98 moves downwardly only through a larger distance. Thus, the movement of section 44 of drive shaft 34 is sufficiently small to prevent it from contacting adjacent structure, thereby avoiding interference with the rotation of the drive shaft.

During forward movement of the vehicle over the road, outdrive 61 is in its retracted, elevated position shown in dashed lines in FIG. 3. It is elevated automatically when the vehicle moves out of the water and is driven onto the land as hereinafter described. Outdrive 61 is raised and lowered by a separate electro-hydraulic system interconnected to the vehicle interlock system in that the outdrive will raise automatically as the vehicle leaves the water (when vehicle weight is transferred to the front axle). Indicator lights show the position of the outdrive. An outdrive up-down switch can be left in an up or down position (without spring return to off) because limit switches sense and shut off the current to the system at the limits. (Also, automatic raising could not be incorporated without limit switches.)

When it is desired to use the vehicle in water, the vehicle is driven into the water from the shore of a body of water. As the vehicle leaves the shore, it will float on water because of its inherent buoyancy and the wheel supports will sag in the water. Then, for proper operation in the marine mode, the front and rear wheels and the corresponding wheel supports are elevated into their respective wheel wells 23 and the hatch panels 232 are moved into place covering the open bottoms of respective rear wheel wells. The sequence of operation to change from travel over the land to marine operation can be summarized in the following steps:

With the vehicle floating in the water, the wheels are down and locked, the automotive transmission is shifted into neutral and the front wheels are moved to a center, straight-forward position. The control system is now ready for operation to raise the front and rear wheels and the corresponding wheel supports.

Shifting the automotive transmission to neutral activates a switch 300 coupled with the gear shift lever. When the weight of the vehicle moves off the front wheels, i.e., when the vehicle commences to float in the water, a second switch 302 is actuated. An indicator light 304 in series with battery 290 and with one side of the switch 300 will be energized if last-mentioned switch is not actuated, i.e., when the automotive transmission is not in neutral.

A key 306 is then inserted into the key slot of a key-actuated switch 308 and the key is turned to actuate switch 308, putting it into the position shown in FIG. 17. Current from battery 290 then flows out of its positive terminal, through lead 310, through switch 308, switch 300, switch 302 to switches 312 and 314. When current flows through either switch 312 or 314, the current is directed by lead 315 through solenoid coil 316 of fluid valve 266 to ground. Valve 266 thus shifts so as to admit fluid from line 276 to the right-hand ends of the cylinders of assemblies 264, thereby moving pins 265 to the left when viewing FIG. 17, thereby unlocking rear linkages 222. When this occurs, the shiftable poles of switches 312 and 314 move to their left-hand positions of FIG. 17 and current flows through both switches 312 and 314 through a lead 318 to an indicator light 320 which indicates that the rear wheels are unlocked. Also, the shiftable poles of the other switches 372 and 374 corresponding to respective assemblies are moved to their left-hand positions of FIG. 17 as pins 265 are moved to unlocked positions.

When lock pins 265 are shifted to unlocked positions, current flows from battery 290, through switches 308, 300, 302, 312 and 314, then through switches 322 and 324 associated with assemblies 202 for front lock pins 200, through a lead 326 to the solenoid coil 328 of valve 203, thereby causing the valve to admit fluid to the right-hand ends of the cylinders of assemblies 202, moving pins 200 to the left when viewing FIG. 17, thereby unlocking the front wheels. When the front wheels are unlocked, the shiftable poles of switches 322 and 324 shift to their left-hand positions of FIG. 17 so that current can flow through lead 332 to an indicator light 334 indicating the front wheels are unlocked.

A switch 336 in series with switches 312, 314, 322 and 324 and coupled in any suitable manner to the steering mechanism of the vehicle must be closed before the front wheels can be raised. This will assure that no structural damage will occur, such as might happen if the front wheels are turned, closing of switch 336 is accomplished by centering the front wheels of the vehicle by rotating steering wheel 74. An indicator light 337 is energized when switch 336 is closed, indicating the front wheels are properly centered. Until light 337 is actuated, the steering wheel should be manipulated until the light comes on.

The vehicle operator then moves a double-throw, double-pole switch 338 from a neutral or down position into an up position wherein a current flows through the switch 336, lead 340, switch 338a, forming one part of switch 338, lead 342, a switch 344 to the solenoid coil 346 of valves 278 causing fluid from fluid line 276 to be admitted to the right-hand end of cylinder 172, causing it to move the front wheel chain cases 134 to their elevated, retracted positions.

When properly positioned in their retracted positions, assembly 172 shifts switch 344 so that current can flow through an indicator light 348 indicating the front wheels are up. Current then flows through another switch 350, to the solenoid coil 352 of valve 280 of assembly 210. This causes valve 280 to direct fluid from fluid line 276 into the left-hand end of the cylinder of assembly 210, causing the rear wheel supports 216 to be elevated. When properly elevated, assembly 210 shifts switch 350 so that current flows through an indicator light 354 which indicates the rear wheels are up.

Then, current flows through another switch 356 to a relay coil 358 which closes a switch 360 placing one side of motor 260 in electrical contact through leads 362, 364 and 366a with the positive side of battery 290. The opposite side of the motor is coupled by a lead 368 to one side of switch 338b forming a second part of switch 338 and is connected by a lead 372 to ground when switch 338 moves to its up position. Then, motor 260 is energized to cause rear hatch panels 232 to move from their open positions to their closed positions. When this occurs, switch 356 is actuated, energizing an indicator light 374, indicating the hatch panels are closed.

The operator then turns key 306 in key switch 308, changing it to a lock-out condition. This locks the wheels in their up positions and locks the hatch panels in their closed positions.

When the wheel supports are elevated, lock pins 200 and 265 are then extended to lock such wheel supports in their up positions. This is accomplished by directing current from the negative side of battery 290, through key switch 308, through a switch 372 and a switch 374 coupled to respective assemblies 264, switches 372 and 374 being closed when the pistons of assemblies 264 move to the left when viewing in FIG. 17. When this occurs, current flows through either switch 372 or 374, through a second solenoid coil 376 of valve 266 to lead 366 causing valve 266 to pass fluid from fluid line 276 to the left-hand end of the cylinders of assemblies 264, thereby moving pins 265 to their extended locked positions, underlying rear wheel supports 216, thereby preventing them from being lowered. When this occurs, switches 372 and 374 return to the operative positions shown in FIG. 17. If pins 265 are not fully extended, an indicator light 377 and a buzzer 379 are actuated to provide an indication of such malfunction.

Valve 203 is energized subsequent to the actuation of valve 266 by current flowing from the negative side of the battery through switches 372 and 374 to either switch 380 or 282 of assemblies 202, thus allowing current to pass through a second solenoid coil 384 of valve 203 to lead 366, causing the valve to admit fluid to the left-hand end of the cylinders of assemblies 202, thereby moving pins 200 outwardly and beneath chain cases 134 to prevent the front wheels from being lowered. An indicator light 381 and a buzzer 383 are actuated if pins 200 are not fully extended.

The key is left in the lock position so that the lock system is always operative. If lock pins 200 and/or 265 somehow retract partially, light 377 and/or 381 and buzzers 383 and/or 379 will automatically light and sound because switches 372, 374, 380 and 382 will have been activated. Solenoids 384 and/or 376 will also actuate automatically to correct the problem. The vehicle is then ready for marine operation under the control of outdrive 61 through motor 30 and tiller 286. In the marine mode, the hull portion of body 12 presents a clean, hydrodynamic lower surface inasmuch as hatch panels close the open bottoms of the rear wheel wells. Also, water in the rear wheel wells is automatically bailed during forward movement, thereby minimizing the water in the rear wheel wells and thereby the weight of the vehicle in the water.

To return vehicle 10 to automotive operation, the hatch must be opened and the wheels lowered while the vehicle is still in the water and before complete control has been removed from the outdrive. The outdrive is used to cause the front wheels, after being lowered, to move into engagement with the ramp so that the front wheels can drive onto the shore and out of the water.

The unlocking procedure is followed in the same way as that described above wherein valves 266 and 203 are sequentially energized so that lock pins 265 and 200, respectively, are retracted and unlocked. The operator then moves switch 338 into its down position, thereby allowing current to flow through switches 312, 314, 322, 324, 336, 338, through lead 400, through switch 401, to a relay coil 402 closing switch 404, thereby connecting the left side of motor 260 with leads 364 and 366a and the positive side of the battery. The opposite side of the battery is connected by lead 369 to ground by way of switch 338b and lead 372. Then, motor 260 operates to open hatch panels 232. When this occurs, switch 401 changes position to energize an indicator light 403 indicating that the hatch panels are open.

Current then flows through switch 401, through a lead 405 to a switch 407 to a second solenoid coil 409 of valve 280. This causes fluid to be directed into the right-hand end of the piston and cylinder assembly 210, moving rear wheels 20 and wheel supports 216 into their down positions and shifting switch 407 so that it energizes an indicator light 411 indicating the rear wheels are down. Switch 407 thereby directs current to a switch 413 which energizes a second solenoid coil 415 of valve 278, thereby actuating assembly 172 to cause the front wheels and chain cases 134 to be lowered. When this occurs, switch 413 shifts, causing an indicator light 417 to be actuated, indicating that the front wheels are down. Then current is caused to flow through switches 308, 372, 374, 380 and 382 in the manner described above for extending or re-locking pins 200 and 265. The vehicle can then be driven out of the water and onto the shore. As the front wheels touch ground, the outdrive is automatically retracted (if it has not been done already manually). As the rear wheels touch ground, the marine transmission is automatically shifted and locked into neutral to prevent the propeller from turning on land and to avoid any possible injury as a result of the same. Now the vehicle is ready for land use.

Outdrive 61 has an electrically actuated gear shift motor 420 (FIG. 17) which permits it to shift between the forward, neutral, and reverse operative conditions thereof. Motor 420 is controlled by a manually actuated, three-position switch unit 422 and a weight switch 424, switch unit 422 and switch 424 being in series with motor 420 to form a circuit coupled across the terminals of battery 290. Switch 424 has two switch portions 424a and 424b corresponding to the forward and reverse operating conditions of motor 420. Switch unit 422 has three separate switch portions corresponding to the forward, neutral and reverse operative conditions of motor 420. The forward and reverse portions of switch unit 422 are enabled only when portions 424a and 424b of switch 424 are closed as shown in FIG. 17, namely, when the weight of the vehicle is off the front wheels thereof. Otherwise, the forward and reverse portions of switch 422 are connected to the neutral portion thereof. Thus, switch 424 provides a safety interlock which assures that the outdrive will not be operated as long as the vehicle is on land but will be rendered operable when the vehicle enters the water. Moreover, motor 420 will be automatically shifted into neutral as the vehicle comes out of the water, assuming the motor is in either the forward or reverse operating conditions.

Means for shifting outdrive 61 from its lowered, operative position to its elevated, retracted position includes a piston and cylinder assembly 426 (FIG 17) coupled to a hydraulic pump 428 operated by a reversible motor 429 to direct fluid under pressure into one end and/or the other of the cylinder 430 of assembly 426. To this end, motor 429 has a ground terminal and two voltage input terminals, one for applying a voltage to the motor to raise the outdrive and one for applying a voltage to the motor to lower the outdrive. The input terminal of the motor corresponding to the raising of the outdrive is connected by a first lead 432 to a relay switch 434 which is connected by a lead 436 to the positive terminal of battery 290. Switch 434 is closed when relay coil 438 is energized and this action occurs when a normally closed limit switch 440, a lead 444, and a manually actuated single-pole, double-throw switch 442 connects lead 366 to coil 438 when switch 442 is in its up position, whereby a voltage is applied to the motor of pump 428 causing it to force hydraulic fluid into the right-hand end (FIG. 17) of cylinder 430 to cause the outdrive to be raised. As the outdrive approaches its raised position, limit switch 440 is switched to a position in which it energizes an indicator light 458, indicating that the outdrive is up. Upward shifting of the outdrive also switches a second limit switch 448 to a position in which it is connected to the other input of motor 429.

To lower the outdrive, switch 442 is switched to its down position; thus, a voltage is applied to the other input terminal of motor 429, causing pump 428 to direct fluid into the lefthand end of cylinder 430 so as to lower the outdrive. A light 460 is energized when the outdrive is in its down position. In its down position, switch 442 is connected to a weight switch 446 in series with limit switch 448, the connection through the weight switch being made only when the vehicle is in the water and thus the outdrive cannot be lowered on land.

When the vehicle weight is supported by the front wheels, such as when the vehicle drives up a ramp and out of the water, switch 446 is opened, thereby breaking the connection between switch 442 and switch 448 and closing a circuit including land 366, lead 437 and lead 452, weight switch 466, switch 440, and coil 438, thereby switch 434 is again closed and a voltage is again applied by way of switch 434 and leads 436 to the pump motor. Thus, the outdrive is automatically raised as the vehicle moves out of the water, although it can be raised when the vehicle is in the water by shifting switch 442 into its up position. This safety feature is provided in case the operator of the vehicle forgets to raise the outdirve as the vehicle comes out of the water. With the outdrive in its lowered position, it would be damaged when the vehicle moves over the ground.

We claim:

1. An amphibious vehicle comprising: a frame; a body mounted on said frame and having a lower portion defining a buoyant hull, whereby said vehicle is movable into and floatable on a body of water; a front wheel and axle assembly; a rear wheel and axle assembly, each of said assemblies having an axle; a pair of ground-engageable wheels, and means rotatably mounting the wheels on respective ends of the corresponding axle for movement relative to the axle from lowered ground-engageable positions beneath and generally vertically aligned with the corresponding axle to elevated, retracted positions; means coupled with each assembly, respectively, for mounting the axle thereof on said frame for up and down movement with respect thereto; means coupled with each assembly, respectively, for moving the wheels thereof from said lowered positions to said elevated positions and return; a power source carried by said frame; a power transfer mechanism for connecting said power source to one of said assemblies to permit the wheels of the latter to be driven, said mechanism having means mounting the same on said frame for movement relative thereto in response to the up and down movement of the corresponding axle as the corresponding wheels are driven, a first of said assemblies having means thereon for pivoting said wheels thereof about respective vertical axes relative to said frame, whereby said wheels of said first assembly can be steered; and means on said frame and coupled with said wheels of said first assembly for steering the same.

2. A vehicle as set forth in claim 1, wherein said power transfer mechanism includes a pair of vertically spaced, generally parallel, rotatable shafts, and means interconnecting the shafts of said mechanism to permit the same to rotate together, one of said shafts being coupled to the power source, the other shaft being coupled to said one assembly, said mechanism mounting means including means pivotally mounting said mechanism on said frame for movement in a generally vertical plane with respect thereto.

3. A vehicle as set forth in claim 1, wherein the frame is comprised of a pair of spaced, fore-and-aft frame members, said one assembly being adjacent to the forward ends of said frame members, said axle mounting means including a pair of elongated, fore-and-aft springs pivotally mounted intermediate their ends thereof on respective frame members, means coupling the rear end of each spring to the axle of said one assembly, and means coupling the forward end of each spring to said frame, whereby the spring is cantilevered with respect to its connection to the adjacent frame member.

4. A vehicle as set forth in claim 1, wherein said wheel mounting means of said one assembly includes a pair of elongated wheel supports rotatably mounted adjacent to first ends thereof on the corresponding axle, said steering means including a shaft rotatably mounted on and extending longitudinally of each wheel support, respectively, of said one assembly, each shaft having an upper end, and including a steering knuckle coupled to the lower end of each wheel support, respectively, a steering arm for each shaft, respectively, each arm extending fore and aft of the frame and having an open slot at its forward end for receiving the upper end of the corresponding shaft, there being a pin alignable with the axis of the corresponding axle for pivotally connecting the upper end of the corresponding shaft to the arm, whereby the shaft can pivot with the wheel support relative to the arm when said pin is aligned with the axis of the corresponding axle.

5. A vehicle as set forth in claim 4, wherein said steering means includes a tie-rod shiftably mounted on said frame and extending transversely thereof, the ends of said tie-rod being pivotally coupled to respective steering arms, and a steering column carried by the frame and coupled to the tie-rod for shifting the same in opposed directions to effect steering of the wheels of said one assembly, each steering arm having means thereon for preventing the canting thereof about a fore-and-aft axis due to the weight of the corresponding wheel when the corresponding wheel support is in an elevated position.

6. A vehicle as set forth in claim 1, wherein said one assembly includes a differential unit and a generally horizontal differential axle, said wheel mounting means for said one assembly including a chain case for each end of said axle, respectively, each chain case being rotatably mounted adjacent to one end thereof on said axle and extending transversely therefrom, the other end of each chain case having a rotatable stub shaft generally parallel to said axle, the corresponding wheel being mounted on each stub shaft, respectively, said wheel moving means including a linkage pivotally coupled to said frame and a respective chain case, and means coupled with each linkage for rotating the same about an axis substantially parallel to said axle to cause rotation of the corresponding chain case relative to the axle.

7. A vehicle as set forth in claim 6, wherein the stub shaft for each chain has a steering knuckle thereon and a second rotatable shaft secured to the knuckle, the corresponding wheel being mounted on the second shaft, said knuckle permitting the wheels to be steered, and means coupled with said knuckle and carried by the chain case for rotating the knuckle to thereby permit steering of the corresponding wheel.

8. Apparatus as set forth in claim 6, wherein said axle mounting means for said one assembly comprises a pair of spaced, generally parallel, fore-and-aft springs, means pivotally mounting each spring intermediate the ends thereof on said frame, means coupling the rear end of each spring to the corresponding axle, and means coupling the front ends of each spring to said frame, whereby said springs are cantilevered with respect to said axle.

9. A vehicle as set forth in claim 1, wherein the axles of said assemblies are above the normal waterline of the body when the vehicle is in the water.

10. A vehicle as set forth in claim 1, wherein is included a marine outdrive having a pivoted rudder, said steering means including a steering column adjacent to the front of the frame, said steering column having a first steering member thereon for steering the wheels of said first assembly and a second steering member thereon coupled to said rudder for pivoting the same relative to said frame, said first and second members being operable independently of each other.

11. A vehicle as set forth in claim 1, wherein said body has a pair of rear wheel wells, each well having an open bottom, a hatch panel for each well, respectively, means mounting each hatch panel on said body for movement from a first position in closing relationship to the bottom of the corresponding well to a second position underlying the hull, and means coupled with each hatch panel for moving the same in opposite directions.

12. An amphibious vehicle comprising: a frame; a body mounted on said frame and having a lower portion defining a buoyant hull, whereby said vehicle is movable into and floatable on a body of water; a front wheel and axle assembly; a rear wheel and axle assembly, each of said assemblies having an axle, a pair of ground-engageable wheels, and means rotatably mounting the wheels on respective ends of the corresponding axle for movement relative to the axle from lowered, ground-engageable positions to elevated, retracted positions; means coupled with each assembly, respectively, for mounting the axle thereof on said frame for up and down movement with respect thereto; means coupled with each assembly, respectively, for moving the wheels thereof from said lowered positions and return; a power source carried by said frame; a power transfer mechanism including a hollow chain case having a pair of spaced shafts and means interconnecting the shafts to permit the same to rotate together, one of the shafts being coupled to the power source, the other shaft being coupled to one of said assemblies to permit the wheels of the latter to be driven and to permit the corresponding axle to move up and down relative to said frame as the corresponding wheels are driven, a first of said assemblies having means thereon for pivoting said wheels thereof about respective vertical axes relative to said frame, whereby said wheels of said first assembly can be steered; an arm pivotally mounted adjacent to one end thereof on said frame for rotation about a first, generally horizontal axis extending fore and aft of the vehicle, the arm being pivotally mounted adjacent to its opposite end of said chain case intermediate the shafts thereof for rotation about a second axis substantially parallel with said first axis; and means on said frame and coupled with said wheels of said first assembly for steering the same.

13. A vehicle as set forth in claim 12, wherein said chain case has an equilibrium position and is movable into a number of operative positions on opposite sides of said equilibrium position, and wherein is provided yieldable means coupled with said chain case for counterbalancing the weight of the same when the latter is in said equilibrium position.

14. A vehicle as set forth in claim 13, wherein said arm is pivotally coupled to said chain case substantially at the center of gravity thereof and at a location below the pivotal connection of said arm to said frame, the arm having a configuration permitting the upper shaft of the chain case to move through a greater vertical distance than the lower shaft thereof when the chain case moves into any one of said operative positions.

15. A vehicle as set forth in claim 13, wherein said frame includes a pair of spaced, fore-and-aft frame members, said chain case being between the frame members, one of the frame members having a strut rigid thereto and extending upwardly therefrom, said arm being pivotally coupled to the upper end of the strut and extending downwardly therefrom and toward the other frame member.

16. A vehicle as set forth in claim 13, wherein said yieldable means includes a spring interconnecting said arm and the other frame member.

17. A vehicle as set forth in claim 13, wherein said frame comprises a pair of spaced, fore-and-aft members, said chain case being between the frame members, one of the frame members including a pair of spaced struts rigid thereto and extending upwardly therefrom, said arm including a pair of spaced arm members pivotally coupled to the upper ends of respective struts and extending downwardly therefrom toward the other frame member, the arm members being pivotally coupled to opposed sides of said chain case, there being a link interconnecting the lower ends of said arm members, said yieldable means including a spring interconnecting said link and said other frame member.

18. An amphibious vehicle comprising: a frame; a body mounted on said frame and having a lower portion defining a buoyant hull, whereby said vehicle is movable into and floatable on a body of water; a front wheel and axle assembly; a rear wheel and axle assembly, each of said assemblies having an axle, a pair of ground-engageable wheels, and a pair of elongated wheel supports extending transversely of the corresponding axle for mounting the wheels on respective ends thereof for movement relative to the axle from lowered, ground-engageable positions beneath and generally vertically aligned with the corresponding axle to elevated, retracted positions, said frame having a rotatable shaft for each assembly, respectively, each shaft being substantially parallel to the corresponding axle; means coupled with each assembly, respectively, for mounting the axle thereof on said frame for up and down movement with respect thereto; an actuatable power device coupled with each shaft, respectively, for rotating the same in opposed directions; a linkage interconnecting each wheel support, respectively, with the corresponding shaft for rotating the wheel support about the corresponding axle when the corresponding power device is actuated to thereby effect movement of the corresponding wheels from said lowered positions to said elevated positions and return, each linkage being articulated to permit the corresponding wheel support to move up and down when the corresponding wheel is in its lowered position; a power source carried by said frame; a power transfer mechanism shiftably carried by said frame for connecting said power source to one of said assemblies to permit the wheels of the latter to be driven and to permit the corresponding axle to move up and down relative to said frame as the corresponding wheels are driven, a first of said assemblies having means thereon for pivoting said wheels thereof about respective vertical axes relative to said frame, whereby said wheels of said first assembly can be steered; and means on said frame and coupled with said wheels of said first assembly for steering the same.

19. A vehicle as set forth in claim 18, wherein is included means carried by the frame for releasably locking each linkage against movement relative thereto when the corresponding wheel is in its lowered position.

20. A vehicle as set forth in claim 19, wherein is provided interlock means for preventing the release of said lock means when said frame is supported by a wheel and axle assembly.

21. A vehicle as set forth in claim 19, wherein said lock means comprises a pin movable through the linkage means and retractable therefrom only when said wheel and axle assemblies are out of supporting relationship to said frame and said body.

22. An amphibious vehicle comprising: a frame; a body mounted on said frame and having a lower portion defining a buoyant hull, whereby said vehicle is movable into and floatable on a body of water; a front wheel and axle assembly; a rear wheel and axle assembly, each of said assemblies having an axle; a pair of ground-engageable wheels, and means rotatably mounting the wheels on respective ends of the corresponding axle for movement relative to the axle from lowered, ground-engageable positions beneath and generally vertical aligned with the corresponding axle to elevated, retracted positions, the wheel mounting means of one of said assemblies including a pair of elongated wheel supports rotatably mounted adjacent to first ends thereof on the corresponding axle; means coupled with each assembly, respectively, for mounting the axle thereof on said frame for up and down movement with respect thereto; means coupled with each assembly, respectively, for moving the wheels thereof from said lowered positions and return; a power source carried by said frame; a power transfer mechanism shiftably carried by said frame for connecting said power source to a first of said assemblies to permit the wheels of the latter to be driven and to permit the corresponding axle to move up and down relative to said frame as the corresponding wheels are driven, said one assembly having means thereon for pivoting said wheels thereof about respective vertical axes relative to said frame, whereby said wheels of said one assembly can be steered; means on said frame and coupled with said wheels of said one assembly for steering the same, said steering means including a shaft rotatably mounted on and extending longitudinally of each wheel support, respectively, of said one assembly, each shaft having an upper end, a steering knuckle coupled to the lower end of each wheel support, respectively, a steering arm for each shaft, respectively, each arm extending fore and aft of the frame and having an open slot at its forward end for receiving the upper end of the corresponding shaft, there being a pin alignable with the axis of the corresponding axle for pivotally connecting the upper end of the corresponding shaft to the arm, whereby the shaft can pivot with the wheel support relative to the arm when said pin is aligned with the axis of the corresponding axle; and interlock means coupled with said steering means to prevent rotation of the wheel supports of said one assembly when said pin is out of alignment with the axis of the corresponding axle.

23. An amphibious vehicle comprising: a frame; a body mounted on said frame and having a lower portion defining a buoyant hull, whereby said vehicle is movable into and floatable on a body of water; a front wheel and axle assembly; a rear wheel and axle assembly, each of said assemblies having an axle, a pair of ground-engageable wheels, and means rotatably mounting the wheels on respective ends of the corresponding axle for movement relative to the axle from lowered, ground engageable positions beneath and generally vertically aligned with the corresponding axle to elevated, retracted positions; means coupled with each assembly, respectively, for mounting the axle thereof on said frame for up and down movement with respect thereto; means coupled with each assembly, respectively, for moving the wheels thereof from said lowered positions and return; a power source carried by said frame; a power transfer mechanism shiftably carried by said frame for connecting said power source to one of said assemblies to permit the wheels of the latter to be driven and to permit the corresponding axle to move up and down relative to said frame as the corresponding wheels are driven, a first of said assemblies having means thereon for pivoting said wheels thereof about respective vertical axes relative to said frame, whereby said wheels of said first assembly can be steered; and means on said frame and coupled with said wheels of said first assembly for steering the same, said body having a pair of rear wells, each well having an open bottom, a hatch panel for each well, respectively; means mounting each hatch panel on said body for movement from a first position in closing relationship to the bottom of the corresponding well to a second position underlying the hull; and means coupled with each hatch panel for moving the same in opposite directions, each hatch panel having a normally rearwardly facing opening therethrough to permit water to be drawn out of the corresponding wheel well by suction as said vehicle moves in a generally forward direction.

24. An amphibious vehicle comprising: a frame; a body mounted on said frame and having a lower portion defining a buoyant hull, whereby said vehicle is movable into and floatable on a body of water; a front wheel and axle assembly; a rear wheel an axle assembly, each of said assemblies having an axle; a pair of ground-engageable wheels, and means rotatably mounting the wheels on respective ends of the corresponding axle for movement relative to the axle from lowered, ground-engageable positions beneath and generally vertically aligned with the corresponding axle to elevated, retracted positions; means coupled with each assembly, respectively, for mounting the axle thereof on said frame for up and down movement with respect thereto; means coupled with each assembly, respectively, for moving the wheels thereof from said lowered positions and return; an engine carried by said frame and having a transmission and means for shifting the transmission from a neutral condition to a drive condition and return; a power transfer mechanism shiftably carried by said frame for connecting said engine to one of said assemblies to permit the wheels of the latter to be driven and to permit the corresponding axle to move up and down relative to said frame as the corresponding wheels are driven, a first of said assemblies having means thereon for pivoting said wheels thereof about respective vertical axes relative to said frame, whereby said wheels of said first assembly can be steered; and means on said frame and coupled with said wheels of said first assembly for steering the same, said steering means being operable to move the wheels of said first assembly into and out of positions permitting straight-forward movement of the vehicle, each assembly being movable downwardly relative to said frame when the assembly moves out of supporting relationship to said frame as the vehicle enters the water; interlock means coupled with said transmission, said steering means and said assemblies for preventing the movement of said wheels from said lowered positions to said retracted positions when said transmission is in said drive condition, when the wheels of said first assembly are out of straight-forward positions thereof, and when said assemblies are in supporting relationship to said frame.

25. An amphibious vehicle comprising: a frame; a front wheel and axle assembly; a rear wheel and axle assembly; means mounting the axle of each assembly, respectively, on the frame for up and down movement relative thereto, each assembly having means pivotally mounted on the axle thereof and extending laterally therefrom for mounting the corresponding wheels in spaced relationship to the axle and for moving the wheels thereof from lowered, ground-engaging positions beneath and generally vertically aligned with the axle to elevated, retracted positions with respect to the frame, one of the assemblies having means thereon for permitting the wheels thereof to be driven; an engine carried by the frame and coupled with said permitting means to drive the wheels of said one assembly when the wheels are in their lowered position, said engine having transmission operable either in a neutral condition or a driven condition; means coupled with each assembly for releasably locking the wheel mounting means thereof against pivotal movement relative to the corresponding axle; and an electrical circuit having a switch responsive to the operation of said transmission in the neutral condition thereof for enabling the circuit to permit release of the lock means, whereby the wheels can be retracted.

26. A vehicle as set forth in claim 24, wherein is provided means in the circuit for enabling the same only when at least one of the assemblies is out of supporting relationship to said frame.

27. A vehicle as set forth in claim 25, wherein is provided means coupled with the wheels of a first of the assemblies for steering the same, and means coupled with the steering means and the circuit for enabling the latter only when the wheels of the first assembly are in predetermined positions relative to the frame.

28. An amphibious vehicle comprising: a frame; a front wheel and axle assembly; a rear wheel and axle assembly, each assembly including a linkage shiftably mounted on the frame; means mounting the axle of each assembly, respectively, on the frame for up and down movement relative thereto, each assembly having means pivotally mounted on the axle thereof and extending laterally therefrom for mounting the corresponding wheels in spaced relationship to the axle and for moving the wheels thereof from lowered, ground-engaging positions beneath and generally vertically aligned with the axle to elevated, retracted positions with respect to the frame, one of the assemblies having means thereon for permitting the wheels thereof to be driven; a power source carried by the frame and coupled with said permitting means to drive the wheels of said one assembly when the wheels are in their lowered positions; a pin for each linkage, respectively, each pin adapted to extend through the corresponding linkage to lock the latter against movement relative to the frame; and power device coupled with each pin for shifting the latter relative to the frame whereby the corresponding linkage can be released and the corresponding wheels can be retracted.

29. An amphibious vehicle comprising: a frame; a front wheel and axle assembly; a rear wheel and axle assembly; means mounting the axle of each assembly, respectively, on the frame for up and down movement relative thereto, each assembly having means pivotally mounted on the axle thereof and relationship laterally therefrom for mounting the corresponding wheels in spaced relatiohsip to the axle and for moving the wheels thereof from lowered, ground-engaging positions beneath and generally vertically aligned with the axle to elevated, retracted positions with respect to the frame, one of the assemblies having means thereon for permitting the wheels thereof to be driven; a power source carried by the frame and coupled with said permitting means to drive the wheels of said one assembly when the wheels are in their lowered positions, means coupled with each assembly for releasably locking the wheel mounting means thereof against pivotal movement relative to the corresponding axle; means coupled with the lock means for selectively releasing the same, whereby the wheels can be retracted; an outdrive pivotally mounted on the frame near the rear end thereof for movement about a generally horizontal axis from a lowered, operative position to an elevated, retracted position; means coupled with the outdrive for raising and lowering the same; and means responsive to the weight of the frame on one of the assemblies for actuating said raising and lowering means to raise the outdrive when at least one of the assemblies moves into supporting relationship to the frame.

30. A vehicle as set forth in clam 29, wherein said outdrive has a power device for shifting the same into a forward, neutral or reverse operating condition, means coupled with said power device for enabling the same to shift into forward or reverse only when the assemblies are out of supporting relationship to said frame, and means coupled with said power device to automatically shift and lock into neutral when the assemblies are in supporting relationship to the frame.

31. An amphibious vehicle comprising: a frame having a pair of spaced, fore-and-aft frame members and a crossbeam interconnecting the frame members adjacent to their forward ends; a body mounted on said frame and having a lower portion defining a buoyant hull, whereby said vehicle is movable into and floatable on a body of water; a front wheel and axle assembly; a rear wheel and axle assembly, each of said assemblies having an axle; a pair of ground-engageable wheels, and means rotatably mounting the wheels on respective ends of the corresponding axle for movement relative to the axle from lowered, ground-engageable positions beneath and generally vertically aligned with the corresponding axle to elevated, retracted positions; means coupled with each assembly, respectively, for mounting the axle thereof on said frame for up and down movement with respect thereto; means coupled with each assembly, respectively, for moving the wheels thereof from said lowered positions and return; a power source carried by said frame; a power transfer mechanism shiftably carried by said frame for connecting said power source to one of said assemblies to permit the wheels of the latter to be driven and to permit the corresponding axle to move up and down relative to said frame as the corresponding wheels are driven, said one assembly being adjacent to the forward ends of said frame members, the axle mounting means of said one assembly including a pair of elongated, fore-and-aft springs pivotally mounted intermediate their ends on respective frame members; means coupling the rear end of each spring to the axle of said one assembly; an arm for each spring, respectively, each arm being pivotally coupled to and extending downwardly from said crossbeam, each spring being coupled to the corresponding arm at the lower end thereof, whereby the spring is cantilevered with respect to its connection to the adjacent frame members, a first of said assemblies having means thereon for pivoting said wheels thereof respective vertical axes relative to said frame, whereby said wheels of said first assembly can be steered; and means on said frame and coupled with said wheels of said first assembly for steering the same.

32. An amphibious vehicle comprising: a frame; a body mounted on said frame and having a lower portion defining a buoyant hull, whereby said vehicle is movable into and floatable on a body of water; a front wheel and axle assembly; a rear wheel and axle assembly, each of said assemblies having an axle; a pair of ground-engageable wheels, and means rotatably mounting the wheels on respective ends of the corresponding axle for movement relative to the axle from lowered, ground-engageable positions beneath and generally vertically aligned with the corresponding axle to elevated, retracted positions; means coupled with each assembly, respectively, for mounting the axle thereof on said frame for up and down movement with respect thereto; means coupled with each assembly, respectively, for moving the wheels thereof from said lowered positions and return; an engine carried by said frame and having a transmission and means for shifting the transmission from a neutral condition to a drive condition and return; a power transfer mechanism shiftably carried by said frame for connecting said power source to one of said assemblies to permit the wheels of the latter to be driven and to permit the corresponding axle to move up and down relative to said frame as the corresponding wheels are driven, a first of said assemblies having means thereon for pivoting said wheels thereof about respective vertical axes relative to said frame, whereby said wheels of said first assembly can be steered; means on said frame and coupled with said wheels of said first assembly for steering the same; and interlock means coupled with said wheel moving means for preventing the actuation thereof and thereby the raising of the wheels when said transmission is in said drive condition.

33. An amphibious vehicle comprising: a frame having a hull thereon, the hull having a pair of rear wheel wells, each well having an open bottom; a front wheel and axle assembly; a rear wheel and axle assembly; means mounting the axle of each assembly, respectively, on the frame for up and down movement relative thereto, each assembly having means pivotally mounted on the axle thereof and extending laterally therefrom for mounting the corresponding wheels in spaced relationship to the axle and for moving the wheels thereof from lowered, ground-engaging positions beneath and generally vertically aligned with the axle to elevated, retracted positions with respect to the frame, one of the assemblies having means thereon for permitting the wheels thereof to be driven; a power source carried by the frame and coupled with said permitting means to drive the wheels of said one assembly when the wheels are in their lowered positions; means coupled with each assembly for releasably locking the wheel mounting means thereof against pivotal movement relative to the corresponding axle; means coupled with the lock means for selectively releasing the same, whereby the wheels can be retracted; a hatch panel for covering the open bottom of each wheel well, respectively; means mounting each hatch panel for movement into and out of closing relationship to the corresponding rear wheel bottom; and means responsive to the sequential release of said locking means and the retraction of the rear wheel and axle assembly for moving the hatch panels to their closed positions.

* * * * *